US005407348A

United States Patent [19]
Mims et al.

[11] Patent Number: 5,407,348
[45] Date of Patent: Apr. 18, 1995

[54] TORCH WITH INTEGRAL FLASHBACK ARRESTORS AND CHECK VALVES

[75] Inventors: Carl W. Mims, Sanger; Roger D. Zwicker, Arlington, both of Tex.

[73] Assignee: Victor Equipment Company, Denton, Tex.

[21] Appl. No.: 17,734

[22] Filed: Feb. 10, 1993

[51] Int. Cl.⁶ ............................................. F23D 14/82
[52] U.S. Cl. .................................. 431/346; 431/347; 137/454.2
[58] Field of Search ............................. 431/346, 347; 137/454.2

[56] References Cited

U.S. PATENT DOCUMENTS

| | | |
|---|---|---|
| 640,638 | 1/1900 | Diehl . |
| 1,211,563 | 1/1917 | Eliason . |
| 1,262,351 | 4/1918 | Jones et al. . |
| 1,276,893 | 8/1918 | Fischer . |
| 1,290,422 | 1/1919 | Vale et al. . |
| 1,711,262 | 4/1929 | Chastain . |
| 1,726,804 | 9/1929 | Byers . |
| 2,198,342 | 4/1940 | Jacobsson et al. . |
| 2,363,655 | 11/1941 | Stettner . |
| 2,371,970 | 3/1945 | Marra . |
| 2,417,670 | 3/1947 | Anthes . |
| 2,520,001 | 8/1950 | Eicher . |
| 2,609,281 | 9/1952 | Smith . |

(List continued on next page.)

FOREIGN PATENT DOCUMENTS

| | | |
|---|---|---|
| 1211563 | 10/1960 | Germany . |
| 1629962 | 11/1971 | Germany . |
| 919209 | 2/1963 | United Kingdom . |

OTHER PUBLICATIONS

Modern Engineering Company, Inc.—Advertising Brochure "Guardian Flashback Arrestor & Check Valve".
Kioke America, Inc. Advertising Brochure "Direct Coupling Dry Type Flashback Arrestor for Welding-/Cutting Unit Quick Release/Reverse Flow Prevention Valve".
Victor Sales Bulletin "Flashback Arrestors" May 15, 1992.
Drawing of Flamebuster and Flamebuster Plus Nov. 1990.
Victor Equipment Co. Master Catalog.
Western Enterprises Sales Brochure.
L-Tec Welding and Cutting Systems Advertising Brochure.
IBEDA GmbH Advertising Brochure "Flashback Arrestors".
Smith Division of Tescom Corporation "Flashback Arrestors Regulator and Torch Mount".
Publication from Welding World, vol. 31, No. 3, May 1993 Oxford GB Borden et al., "Backfire and flashback in oxyfuel processes".

Primary Examiner—Larry Jones
Attorney, Agent, or Firm—Herzog, Crebs & McGhee

[57] ABSTRACT

In a torch which uses oxygen and a fuel gas, a first flashback assembly and a second flashback assembly are formed as an integral part of the torch handle. Each flashback assembly includes three primary components as follows: a porous metal flashback arrestor, a retainer and a check valve subassembly. In the preferred embodiment, the porous metal flashback arrestor is mounted on one end of the retainer and the check valve subassembly is held in the other end. In an alternative embodiment, the check valve subassembly is positioned on the interior of the porous metal flashback arrestor. Each flashback assembly can be easily removed and replaced during periodic reconditioning of the torch. The flashback assemblies utilize a parts-in-place principle which precludes operation of the torch unless both flashback assemblies are installed in the torch handle. The porous metal flashback arrestor is designed to reduce the possibility of migration of a flashback upstream from the torch. The check valve subassemblies are designed to reduce the possibility of reverse flow of gas upstream from the torch. This invention does not prevent flashback from occurring; however, it does reduce the possibility of a flashback migrating from the torch into the hose or other components in a typical oxy-fuel cutting, heating, soldering, brazing or welding system.

19 Claims, 21 Drawing Sheets

U.S. PATENT DOCUMENTS

| | | |
|---|---|---|
| 2,611,424 | 9/1952 | Smith . |
| 2,830,657 | 4/1958 | Teti ........................................ 431/346 |
| 2,915,187 | 12/1959 | Jaffe ........................................ 210/446 |
| 2,981,322 | 4/1961 | Schum . |
| 3,031,285 | 4/1962 | Hedberg . |
| 3,091,281 | 5/1963 | Clark, Jr. . |
| 3,243,272 | 3/1966 | Schmitz . |
| 3,255,803 | 6/1966 | Hach, Jr. et al. ............... 431/346 X |
| 3,386,665 | 6/1968 | Iozzi et al. . |
| 3,388,962 | 6/1968 | Baumann . |
| 3,503,418 | 3/1970 | Petrucci et al. . |
| 3,791,406 | 2/1974 | Phillips . |
| 3,873,028 | 3/1975 | Miller . |
| 4,022,441 | 5/1977 | Turney . |
| 4,030,710 | 6/1977 | Turney . |
| 4,081,656 | 3/1978 | Brown . |
| 4,143,853 | 3/1979 | Abramson . |
| 4,248,384 | 2/1981 | Zwicker . |
| 4,286,620 | 9/1981 | Turney ............................ 137/454.2 |
| 4,361,420 | 11/1982 | Bell . |
| 4,409,002 | 10/1983 | Zwicker . |
| 4,664,621 | 5/1987 | Sugisaku et al. . |
| 4,806,096 | 2/1989 | Kobayashi . |
| 4,818,220 | 4/1989 | Kobayashi . |

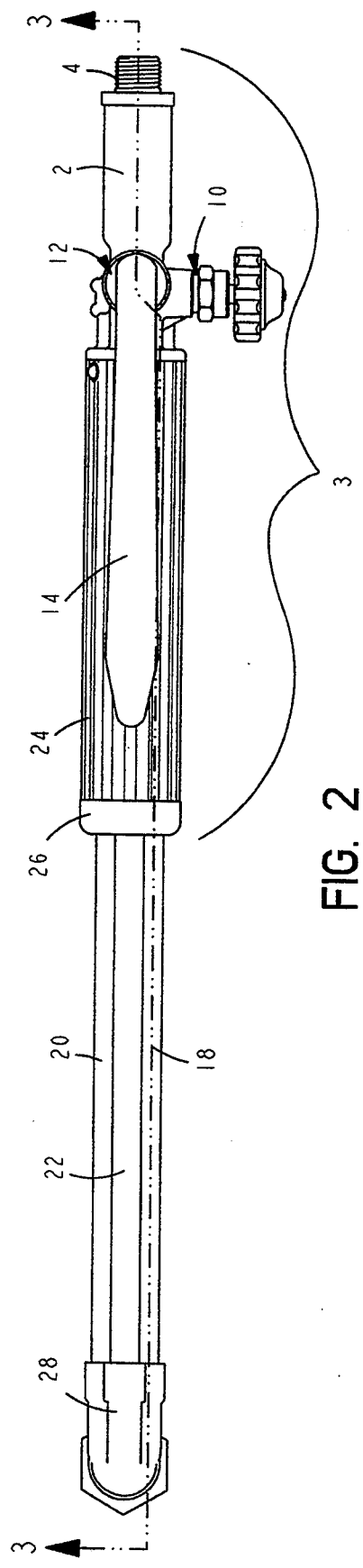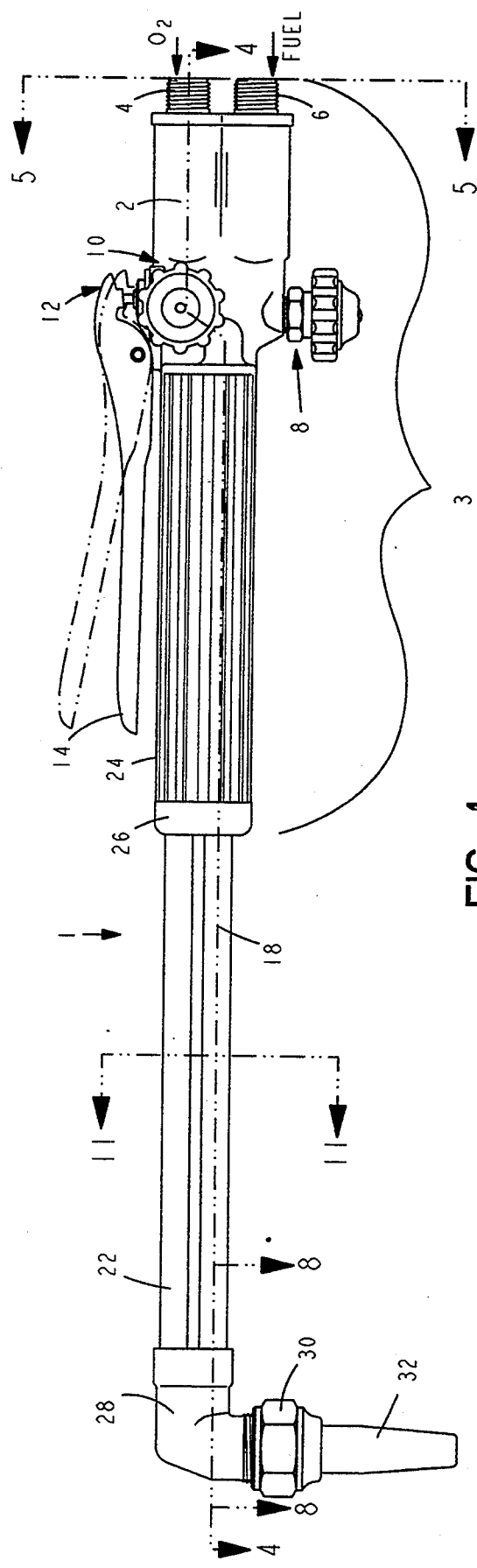

TORCH WITH INTEGRAL FLASHBACK ARRESTORS AND CHECK VALVES

BACKGROUND OF THE INVENTION

1. Field of the Invention

This invention relates to oxy-fuel torches which are used for cutting ferrous metals. These cutting torches operate with a fuel gas and oxygen. Acetylene is a commonly used fuel gas; however, other types of fuel gas are also used, including, for example, natural gas, propane, hydrogen and MAPP gas. This invention also relates to oxy-fuel torches which can be removably connected to various attachments for welding, cutting, brazing or heating. These multi-purpose oxy-fuel torches also operate with a fuel gas and oxygen as previously described.

2. Description of Prior Art

Flashback is a potentially dangerous situation which can occur in oxy-fuel cutting torches and multi-purpose torches such as those described above. When a flashback occurs, it may cause damage to the equipment. In some instances, personal injury also results to the operator and/or those in proximity to the equipment. The present invention does not eliminate the occurrence of flashbacks. The purpose of the present invention is to reduce the possibility that a flashback will migrate from the torch upstream to other components in a typical oxy-fuel cutting system.

Those skilled in this art are familiar with the components in a typical oxy-fuel cutting system. The torch is releasably connected to an oxygen hose and a fuel gas hose. It is common in the industry for the oxygen hose to be colored green and the fuel gas hose to be colored red. These two hoses are typically assembled together to form a unitized hose bundle which is more convenient for the operator to manipulate in the work place.

The oxygen hose connects to a gas regulator which is in fluid communication with a cylinder shutoff valve mounted on the oxygen cylinder. Oxygen cylinders are also typically colored green. Industrial oxygen cylinders are typically rated for pressures of up to 3,000 pounds per square inch ("PSI"). The regulator is used to reduce the outlet pressure, going from the cylinder and into the oxygen hose which varies, depending on the size of the cutting tip. Generally speaking, the oxygen pressure at the outlet of the regulator may range between 20 and 65 pounds per square inch gauge ("PSIG"). Higher outlet pressures are used with larger sized cutting tips. Lower outlet pressures are used with lower sized cutting tips. The appropriate outlet pressure is best determined by reference to a tip chart which lists optimum pressures and flow rates for each different size tip. The oxygen connectors on the hose and regulator are a special size thread which is specified by the Compressed Gas Association ("CGA").

The fuel gas hose connects to a regulator which is in fluid communication with the cylinder shutoff valve on the fuel gas cylinder. Acetylene is a commonly used fuel gas for cutting torches, as described above. A typical acetylene cylinder is formed with an interior porous mass which is saturated with liquid acetone. Acetylene gas is absorbed by the liquid acetone to facilitate safe storage. When the cylinder shutoff valve is opened, the acetylene gas vaporizes and migrates to the top of the acetylene cylinder where it passes through the cylinder shut-off valve and the regulator into the fuel gas hose which feeds the torch. Industrial acetylene cylinders are typically rated for pressures of 400 PSIG at 105° F. Outlet pressures of acetylene at the regulator vary, depending on the size of cutting tip in use and typically range between 1 and 15 PSIG. Larger cutting tips require higher pressures and smaller cutting tips require lower pressures. Again, the operator should make reference to a tip chart to determine optimal outlet pressures and flow rates. The fuel gas connectors on the hose and regulator are special size left-hand threads which are specified by the CGA to avoid confusion.

Flashback occurs when the flamefront migrates from outside the tip to the inside of the torch, which causes the torch to become very hot and, if allowed to burn, may even cause it to melt. The flamefront can also migrate upstream back into one or both hoses, causing them to burn or rupture. In some extreme situations, the flamefront may migrate further upstream into a regulator and/or a gas cylinder causing them to explode.

Various types of safety devices have been developed for use in typical oxy-fuel cutting systems. For example, U.S. Pat. No. 4,286,620 assigned to Victor Equipment Company, the assignee of the present invention, discloses a combination torch and check valve assembly, which is incorporated herein by reference. In this patent, which issued on Sep. 1, 1981, the check valves are internal to the torch and are designed to reduce the possibility of reverse flow of gases from the torch into the hose.

U.S. Pat. No. 4,409,002 discloses a utility torch having a head mixer, which patent is incorporated herein by reference. This patent is also assigned to Victor Equipment Company. The integral head mixer disclosed in this patent, which issued on Oct. 1, 1983, is also designed to reduce the possibility of a flashback migrating from the torch upstream to other components in a typical oxy-fuel cutting system.

Other devices known generally in the trade as "flashback arrestors" have been developed to reduce the possibility of migration of a flashback from the torch. A variety of these devices are disclosed by advertising brochures attached to the Information Disclosure Statement filed concurrently herewith. These flashback arrestors are sold in pairs as after-market accessories. Victor Equipment Company also sells, as an accessory item, a pair of flashback arrestors which can be connected between the torch and the hose in the oxygen flow path and the fuel gas flow path. Alternatively, the flashback arrestors can be connected between the hose and the regulator.

The flashback arrestor manufactured by Victor Equipment is marketed under the tradename FLAMEBUSTER. It includes a porous, powdered metal sintered arrestor and check valve which is designed to reduce the possibility of a flashback from migrating upstream of the sintered component. The porous flashback arrestor has numerous tortuous pathways through which a flamefront must pass in order to migrate further upstream into other components in an oxy-fuel cutting system. In most circumstances, a flamefront will be quenched as it attempts to move through the tortuous pathways in the porous metal flashback arrestor.

Victor Equipment also manufactures another accessory item which is marketed under the trademark FLAMEBUSTER PLUS. This accessory item includes a pair of flashback arrestors and check valves with quick hose connectors manufactured in a cartridge-like format. One cartridge is for oxygen and the other cartridge is for fuel gas. Numerous other competitors manufacture accessory units which include a flashback arrestor and check valves as described in the Information Disclosure Statement. These accessory items can be readily purchased at welding supply stores across the nation.

Porous metal flashback arrestors, including the present invention, are not foolproof devices and do not guarantee that the flamefront will be quenched in all circumstances. For example, if the porous metal flashback arrestor is overheated, it may not quench the flamefront. If the flashback arrestor has been exposed to numerous prior flashbacks, the tortuous pathways may be eroded, thereby reducing the quenching capability.

The after-market flashback arrestors sold by Victor Equipment and others are not universally used in the trade. A pair of after-market flashback arrestors typically costs $40 to $60 (1992 dollars). The additional cost deters some individuals from buying these after-market flashback arrestors and adding them to their oxy-fuel cutting systems. Some individuals are simply not safety conscious and do not see a need for these accessory items. If a pair of flashback arrestors have been installed on the job, they may sometimes be clogged with debris and be taken out of the system by the operator. Existing flashback arrestors sold as after-market items do not use the parts-in-place principle, nor can they be repaired. If they are clogged or otherwise malfunction, they must be replaced.

Some of these after-market accessory items are rather heavy and cumbersome and, if attached to the torch, may adversely affect the balance thereof which is irritating to the operator. Because these after-market accessories are readily removable, the operator may take them off of the torch and install them between the hose and the regulators. Although this affords protection to the regulator and cylinders, it leaves the hose vulnerable to flashback.

Those skilled in the art will recognize that cutting torches are reconditioned on an "as needed" basis. In a typical fabrication plant, an operator will go to a tool crib and be issued a torch for a specific project. At the conclusion of that project, the torch will be returned to the tool crib. This sort of heavy industrial use eventually renders the torch unsuitable for further cutting. The tip may be clogged or other malfunctions may occur such as damage to various components of the torch.

The tool crib foreman will have a large number of cutting torches in supply, depending on the size of the plant. When a torch ceases to function properly, it will be set aside until a suitable quantity of malfunctioning torches have been accumulated. These malfunctioning torches will then be sent to a welding supply shop or to a reconditioning shop which will recondition the torches and bring them back to operational specifications. Torches manufactured by Victor Equipment Company are reconditioned many times during their useful life span, which may be as long as ten or twenty years. It may be necessary during the useful life of these torches to replace the flashback arrestor, if any, on one or more occasions, depending on the nature of use to which the torch is exposed. Existing flashback arrestors are not subject to repair. If they are to be replaced, a new pair must be purchased. This added expense deters replacement of flashback arrestors in existing systems during reconditioning.

The present invention includes a torch which has a pair of replaceable flashback assemblies which are formed as an integral part of the torch handle. These flashback assemblies are easy to replace and cost less than a pair of after-market flashback arrestors. This invention uses the parts-in-place principle (PIP) as an additional safety feature. If a flashback assembly is removed, the torch handle can no longer be connected to the hose. Removal of one or both of the flashback assemblies therefore renders the torch inoperative.

The present invention does not prevent the occurrence of a flashback. Rather, the invention is designed to reduce the possibility that a flashback will migrate upstream from the torch handle into the hose, regulators or gas cylinders. The invention is intended to provide an added measure of safety. The invention is not foolproof and, under certain circumstance, it will not prevent migration of a flashback upstream from the torch handle into the hose or elsewhere.

SUMMARY OF THE INVENTION

The present invention includes a torch with a pair of replaceable flashback arrestors and check valves. Each flashback arrestor and check valve is formed into a flashback assembly. A portion of the first flashback assembly is positioned in the torch handle and is in fluid communication with the oxygen hose. A portion of the second flashback assembly is positioned in the torch handle and is in fluid communication with the fuel gas hose.

Each flashback assembly can be easily replaced. The replaceable flashback assembly includes three primary components as follows: (a) a flashback arrestor which is a porous metal sintered part which is designed, in most instances, to quench a flamefront passing therethrough; (b) a retainer which supports the porous metal flashback arrestor; and (c) a check valve subassembly to reduce the possibility of reverse flow of gas from the torch into the hose. The invention utilizes the PIP principle so that the torch cannot function if either flashback assembly has been removed from the torch.

Each check valve subassembly is open during normal operation of the torch, allowing gas to flow from the hose through the check valve subassembly through the torch to the cutting tip. If a reverse flow situation develops, each check valve is designed to close, in most instances, to reduce the possibility of reverse flow of gas from the torch handle into the hose.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

FIG. 1 is a side elevation view of an oxy-fuel cutting torch.

FIG. 2 is a top plan view of the oxy-fuel cutting torch shown in FIG. 1.

DESCRIPTION OF THE PREFERRED EMBODIMENT

Figure 3:
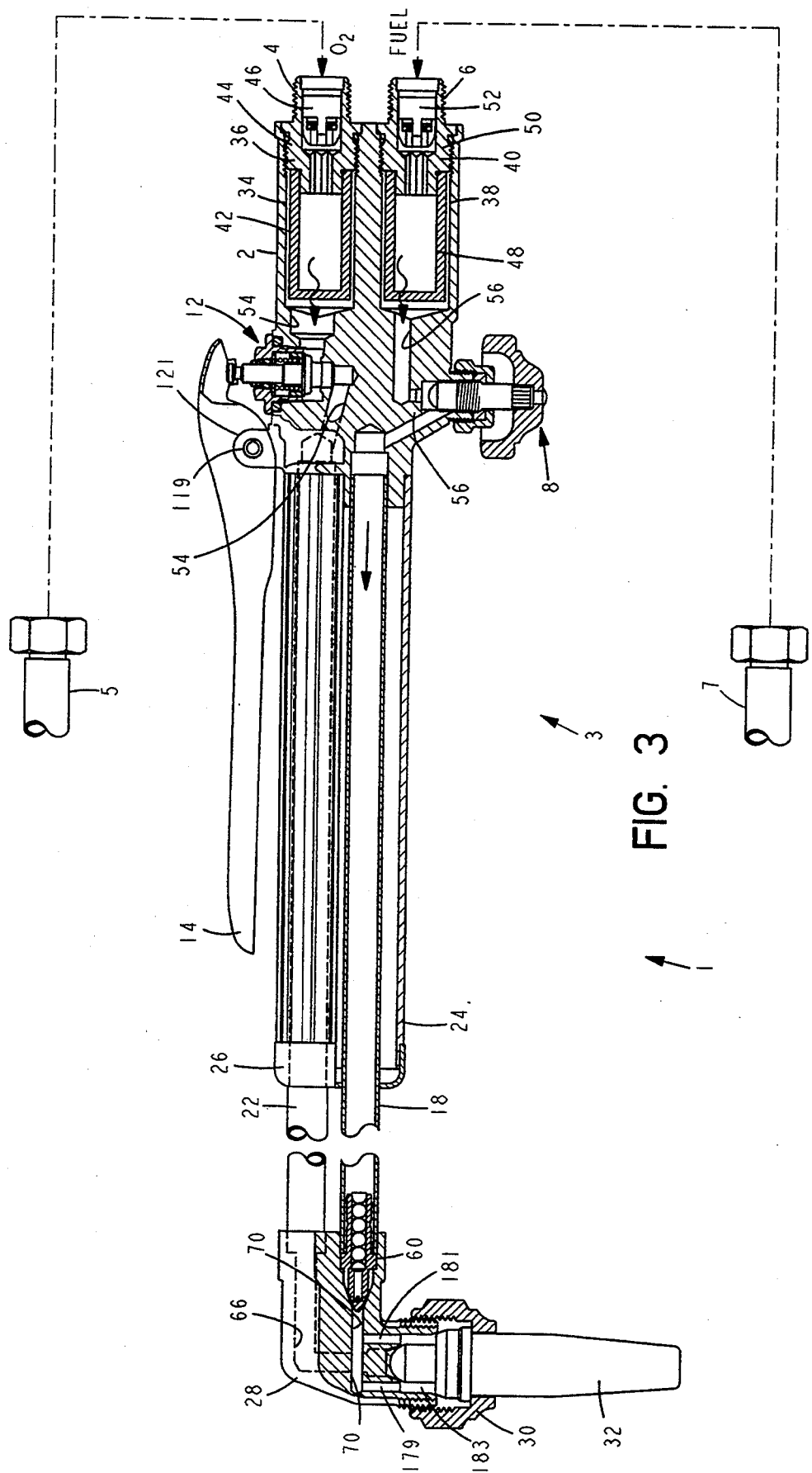
FIG. 3 is a partial section view of the oxy-fuel cutting torch shown in FIG. 1.

Referring to FIG. 1, a cutting torch is generally identified by the numeral 1. The body 2 includes an oxygen hose connector 4 which removably connects to an oxygen hose 5, and a fuel gas hose connector 6 which removably connects to the fuel gas hose 7. Mounted in the body 2 is a fuel valve assembly generally identified by the numeral 8, an oxygen valve assembly generally identified by the numeral 10 and a cutting oxygen valve assembly generally identified by the numeral 12. The lever 14 operates the cutting oxygen valve assembly 12. As shown in this drawing, the lever 14 is depressed which fully opens the cutting oxygen valve assembly 12. When the lever 14 is in the elevated position as shown in phantom in this drawing, the cutting oxygen valve assembly 12 is closed.

Three tubes enter the body 2 and pass through the barrel 24. A first tube 18, which will be identified as the preheat fuel tube, is in fluid communication with fuel passageways in the body 2, the fuel gas hose connector 6 and the gas hose 7. As second tube 20, which will be identified as the preheat oxygen tube, is in fluid communication with oxygen passageways in the body 2, the oxygen hose connector 4 and the oxygen hose 5. A third tube 22, which will be identified as the cutting oxygen tube, is likewise in fluid communication with oxygen passageways in the body 2, the oxygen hose connector 4 and the oxygen hose 5. The elongate barrel 24 engages the body 2 on one end and a collar 26 on the other end. The barrel 24 provides a convenient place for the operator to grip the cutting torch 1 and to manipulate the lever 14 for the cutting oxygen valve assembly 12. For purposes of claim interpretation, the term "torch handle" when used in connection with a cutting torch encompasses those components within the bracket identified by the numeral 3.

The three tubes, 18, 20 and 22, are welded or silver soldered to the head 28 which is threaded to receive a nut 30 which releasably secures the cutting tip 32 to the head 28. Those skilled in the art will recognize that the cutting tip 32 comes in various sizes for cutting different thicknesses of metal. For example, Victor Equipment manufactures numerous different sizes of tips for oxy-acetylene cutting systems. A size 000 tip can be used for cutting metal up to ⅛ inch thick. The outlet pressure for a Victor 000 tip at the oxygen regulator should be between 20 and 25 PSIG and should flow approximately 20 to 25 standard cubic feet per hour ("SCFH"). Using acetylene, the fuel gas regulator should be adjusted to approximately 3 to 5 PSIG and should flow approximately 3 to 5 SCFH.

These flow rates and pressure ranges vary with the size of the tip. A size 8 tip manufactured by Victor Equipment is used for cutting metal up to 12 inches in thickness. When using a size 8 tip, the oxygen regulator should be set at approximately 45 to 55 PSIG and should flow approximately 900 to 1000 SCFH. Using acetylene, the fuel gas regulator should be adjusted to approximately 10 to 15 PSIG at the outlet and should flow approximately 48 to 62 SCFH. Outlet pressures and flow rates may vary, depending on torch type and tip size. These pressures and flow rates are provided merely as an example and not as a limitation on the present invention.

Now referring to FIG. 2, the cutting torch 1 is shown in a top plan view. The three tubes, 18, 20, 22, extend from the torch handle 3 to the head 28. The cutting oxygen valve assembly 12 fits into the top of the body 2 and the oxygen valve assembly 10 extends from the side of the torch body 2, as better seen in this drawing.

Figure 4:
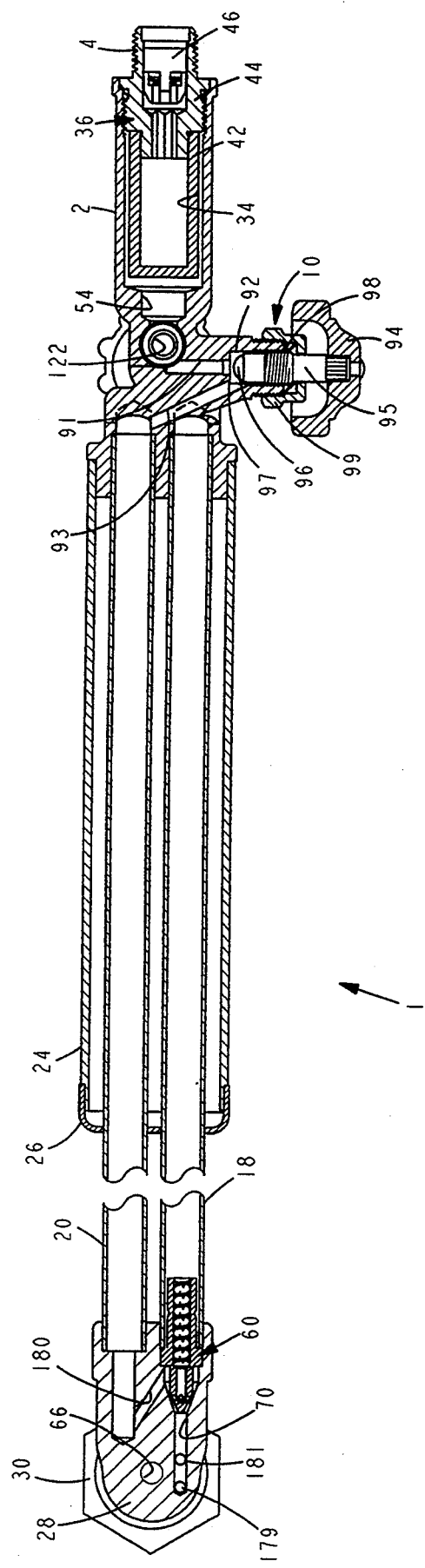
FIG. 4 is top view of the oxy-fuel cutting torch of FIG. 1 along the line 4—4.
Figure 5:
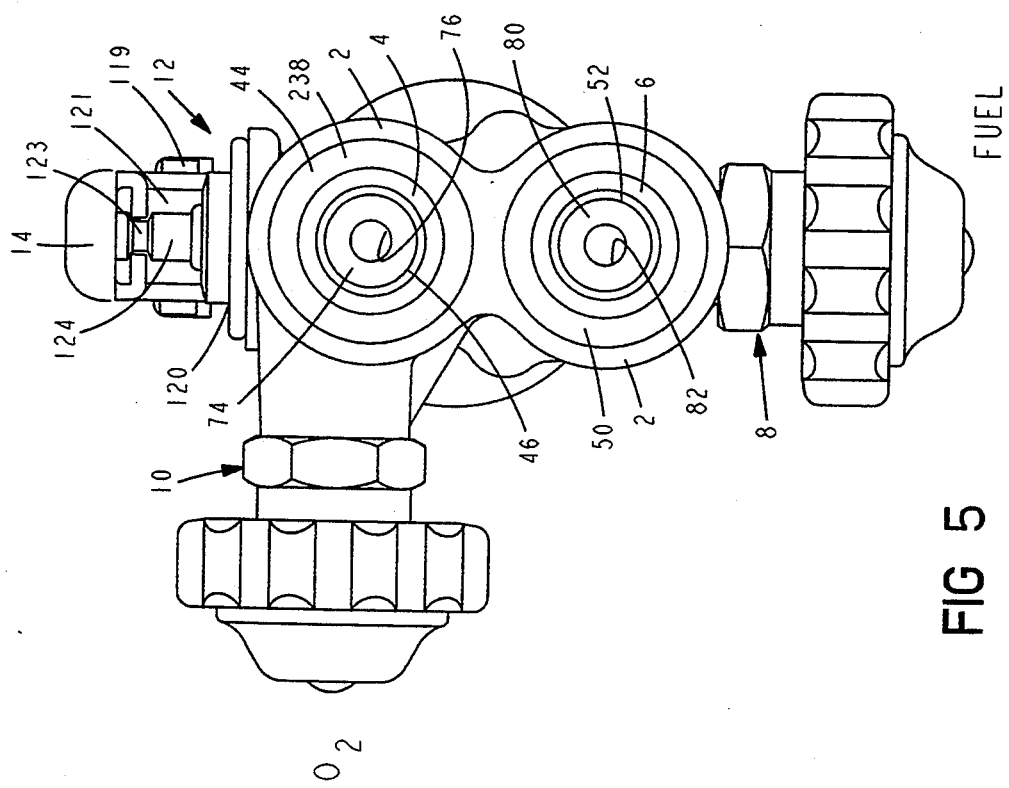
FIG. 5 is an end view of the oxy-fuel cutting torch of Fig. 1 along the line 5—5.

Now referring to FIGS. 3, 4 and 5, the oxygen hose 5 threadably connects to the oxygen hose connector 4 supplying the cutting torch 1 with a supply of oxygen. The fuel gas hose 7 threadably connects to the fuel gas connector 6 supplying the cutting torch 1 with a supply of fuel gas, such as acetylene. The three tubes 18, 20 and 22 have been shortened to show an enlarged view of the torch handle 3 and the head 28.

An oxygen passageway 54 is formed in the body 2, which passageway enlarges to define the first chamber 34 sized and dimensioned to removably receive a portion of the oxygen flashback assembly 36. The oxygen flashback assembly 36 includes three primary components as follows: a porous metal flashback arrestor 42, a retainer 44 and a check valve subassembly 46. A fuel passageway 56 is formed in the body 2, which passageway enlarges to define a second chamber 38 sized and dimensioned to removably receive a portion of the fuel flashback assembly 40. The fuel flashback assembly 40 likewise contains three primary components as follows: a porous metal flashback arrestor 48, a retainer 50 and a check valve subassembly 52. The oxygen cutting valve assembly 12 is in fluid communication with the oxygen passageway 54.

A fuel gas passageway 56 is formed in the body 2 allowing fluid communication from the second chamber 38 to the preheat fuel tube 18. The fuel valve assembly 8 is positioned in the passageway 56 to control the flow of fuel from the second chamber 38 into the preheat fuel tube 18.

A mixer assembly 60 is captured between the head 28 and the preheat fuel tube 18. The mixer assembly 60 includes a spiral 62 and a mixer 64. The mixer assembly 60 in conjunction with the head was designed to reduce the possibility of migration of flashback from the cutting torch 1 upstream into other system components such as the hose, as explained in detail in U.S. Pat. No. 4,409,002.

A cutting oxygen passageway 66 is shown in phantom in the head 28 in FIG. 3. One end of the cutting oxygen passageway 66 is in fluid communication with the cutting oxygen tube 22 and the other end of the passageway is in fluid communication with the cutting oxygen inlet 68 of the tip 32. A mixed gas passageway 70 is likewise formed in the head 28. The passageway 70 transports a mixture of fuel gas and oxygen from the head 28 to the first gas down tube 179 and the second gas down tube 181, thereafter to the annular ring 183 and to the cutting tip 32.

The fuel valve assembly 8, the oxygen valve assembly 10 and the cutting oxygen valve assembly 12 are shown in FIG. 5. The retainer 44 of the oxygen flashback assembly 36 threadably engages the body 2. The oxygen hose connector 4 extends from and is a part of the retainer 44, in the preferred embodiment. Alternative designs which would be equivalent to this invention could form the oxygen hose connector 4 and the retainer 44 from two separate parts. The oxygen hose connector 4 protrudes outside of the body 2 to threadably engage the oxygen hose 5, not shown in this drawing. The oxygen check valve subassembly 46 is pressed to fit inside the oxygen hose connector 4. The check valve subassembly 46 includes a body 74 with an oxygen inlet bore 76 passing therethrough. The oxygen inlet bore 76 is in fluid communication with the oxygen hose 5. During normal operation of the cutting torch 1, the oxygen check valve subassembly is in the open position allowing oxygen to flow from the oxygen hose 5 into the handle 3 via the oxygen inlet bore 76, through the oxygen check valve subassembly 46 and through the oxygen flashback assembly 36.

During certain circumstances, oxygen may have a propensity to flow in the opposite direction or a mixture of oxygen and fuel gas may have a propensity to flow in the opposite direction. The oxygen check valve subassembly 46 is designed to reduce the possibility of reverse flow by closing in some situations. The spring 304 in the oxygen check valve subassembly has a spring force of 0.015 lbs. and should close the oxygen check valve subassembly when the inlet pressure in the oxygen inlet bore 76 falls to 0 PSI. However, the oxygen check valve subassembly 46 is not designed to stop a flamefront from passing through the subassembly 46. The fuel check valve subassembly 52 is designed to close at the same pressures as the oxygen check valve subassembly 46.

The retainer 50 of the fuel flash arrestor assembly 40 threadably engages the body 2. The fuel hose connector 6 extends from and is a part of the retainer 50 in the preferred embodiment. Alternative designs which would be equivalent to this invention could form the fuel hose connector 6 and the retainer 50 from two separate parts. The fuel hose connector 6 protrudes outward from the body 2 to threadably engage the fuel hose 7, not shown in this drawing. The second check valve subassembly 52 is pressed to fit inside the fuel hose connector 6. The fuel check valve subassembly 52 includes a body 80 and a fuel gas inlet bore 82 therethrough. During normal operation of the cutting torch 1, the fuel gas check valve subassembly 52 is in the open position allowing fuel gas to flow from the fuel gas hose 7 into the handle 3 via the fuel gas inlet bore 82, through the fuel gas check valve subassembly 52 and through the fuel gas flashback assembly 40.

The oxygen passageway 54 is in fluid communication with the port 122 which receives the cutting oxygen valve assembly 12. A preheat oxygen passageway 91 is in fluid communication with the port 122 and another port 92 which receives the preheat oxygen valve assembly 10. Another oxygen passageway 93 is in fluid communication with the port 92 and the preheat oxygen tube 20. When the preheat oxygen valve assembly 10 is open, oxygen flows from the oxygen hose 5 through the oxygen flashback assembly 36, through the passage 54, through the port 122, through the passageway 91 and through the port 92, through the passageway 93 into the preheat oxygen tube 20 and into the head 28. The purpose of the preheat oxygen valve assembly 10 is to control the flow of oxygen from the handle 3 to the head 28. The preheat oxygen valve assembly 10 is shown in the open position in FIG. 4. To close the valve assembly 10, the operator turns the knob 94 which is pressed to fit on the threaded valve stem 95. The threaded stem 95 engages threads formed in the port 92 causing the valve element 96 to engage the valve seat 97 formed in the bottom of the port 92. The seat 97 seals against the valve element 96 stopping the flow of oxygen from passage 91 to passage 93. A packing gland 98 surrounds the valve stem 95 and is held in place by a packing nut 99 to prevent oxygen from escaping from the port 92.

Figure 6:
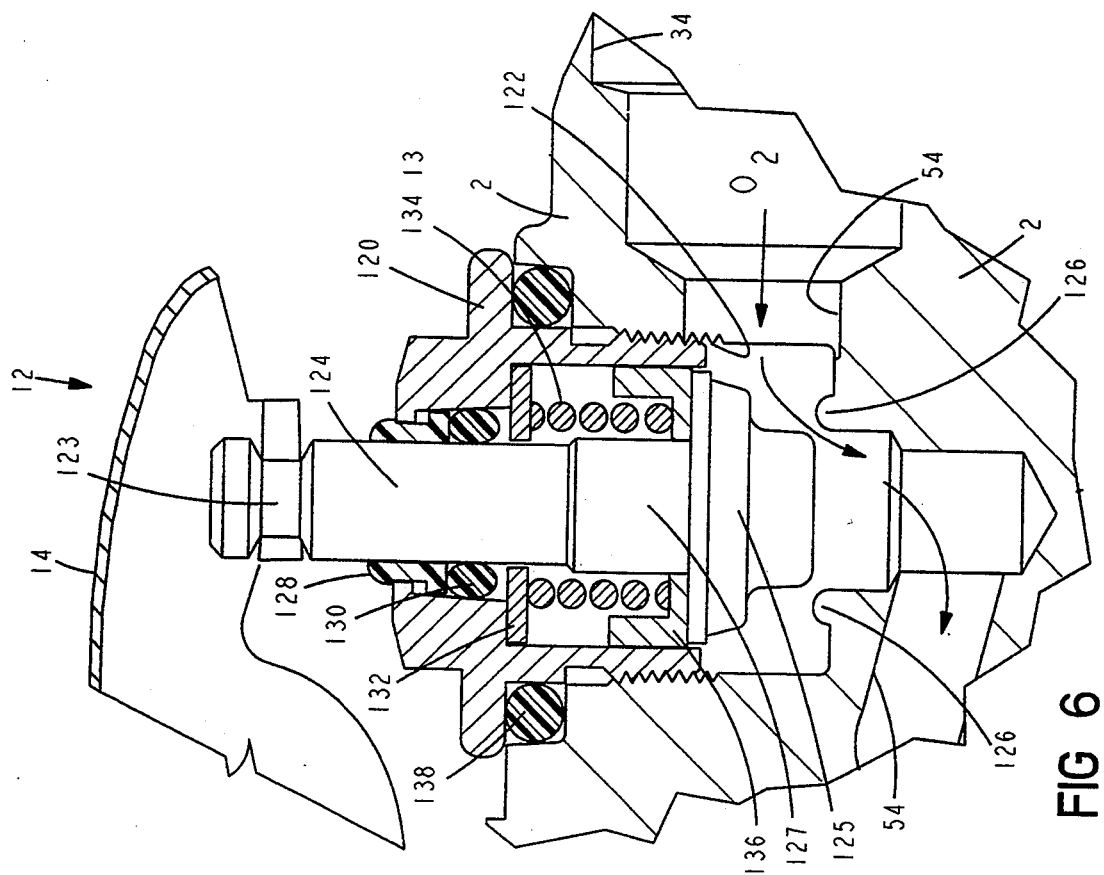
FIG. 6 is an enlarged section view of the cutting oxygen valve shown in FIG. 3.

FIG. 6 is an enlarged section view of the cutting oxygen valve assembly generally identified by the numeral 12. A cap 120 threadably engages a port 122 formed in the body 2. The port 122 is in fluid communication with the oxygen passageway 54 which allows oxygen to flow from the oxygen chamber 34 to the cutting oxygen tube 22. Oxygen moves from the oxygen chamber 34 through the port 122 and the passageway 54 as shown by the flow arrows in the drawings. An elongate movable valve element 124 is held in place in the port 122 by the cap 120. A first end 123 of the elongate movable valve element 124 is engaged by the lever 14 to move the valve element 124 up and down. A seal member 125 is formed on the second end 127 of the elongate movable valve element 124 to engage the circular seat 126 formed in the body 2. The seat 126 is a circular lip that surrounds the flow passage 54.

A bushing 128 surrounds the movable valve element 124 and is held in place by the cap 120. An O-ring 130 is positioned about the movable valve element 124 beneath the bushing 128 to provide a fluid-tight seal as the movable valve element 124 strokes up and down. A washer 132 is positioned inside the cap 120 to hold the spring 134 in place against the cap 120. On the opposite end of the spring is a spring follower 136 which engages the movable valve element 124.

As shown in this figure, the oxygen cutting valve assembly 12 is in the open position which requires the operator's hand to depress the lever 14 which compresses the spring 134, thus disengaging the valve element 125 from the seat 136. When the lever 14 is released by the operator, the force of the spring 134 against the spring follower 136 and the washer 132 causes the movable valve element to stroke downward and to engage the seat 126, thus stopping the flow of oxygen from the oxygen chamber 34 to the passageway 54 into the cutting oxygen tube 22. The lever 14 is pivot mounted so that it can move up and down as shown in phantom in FIG. 1. A pedestal 121, shown in phantom in FIG. 3, extends outwardly from the body 2 to support the lever 14. A pin 119 passes through a hole in the lever 14 and a hole in the pedestal 121 allowing the lever 14 to rock up and down as controlled by the operator.

Another passageway, not shown in the drawing, connects the oxygen chamber 34 with the oxygen control valve assembly 10 and the preheat oxygen tube 20.

Figure 7:
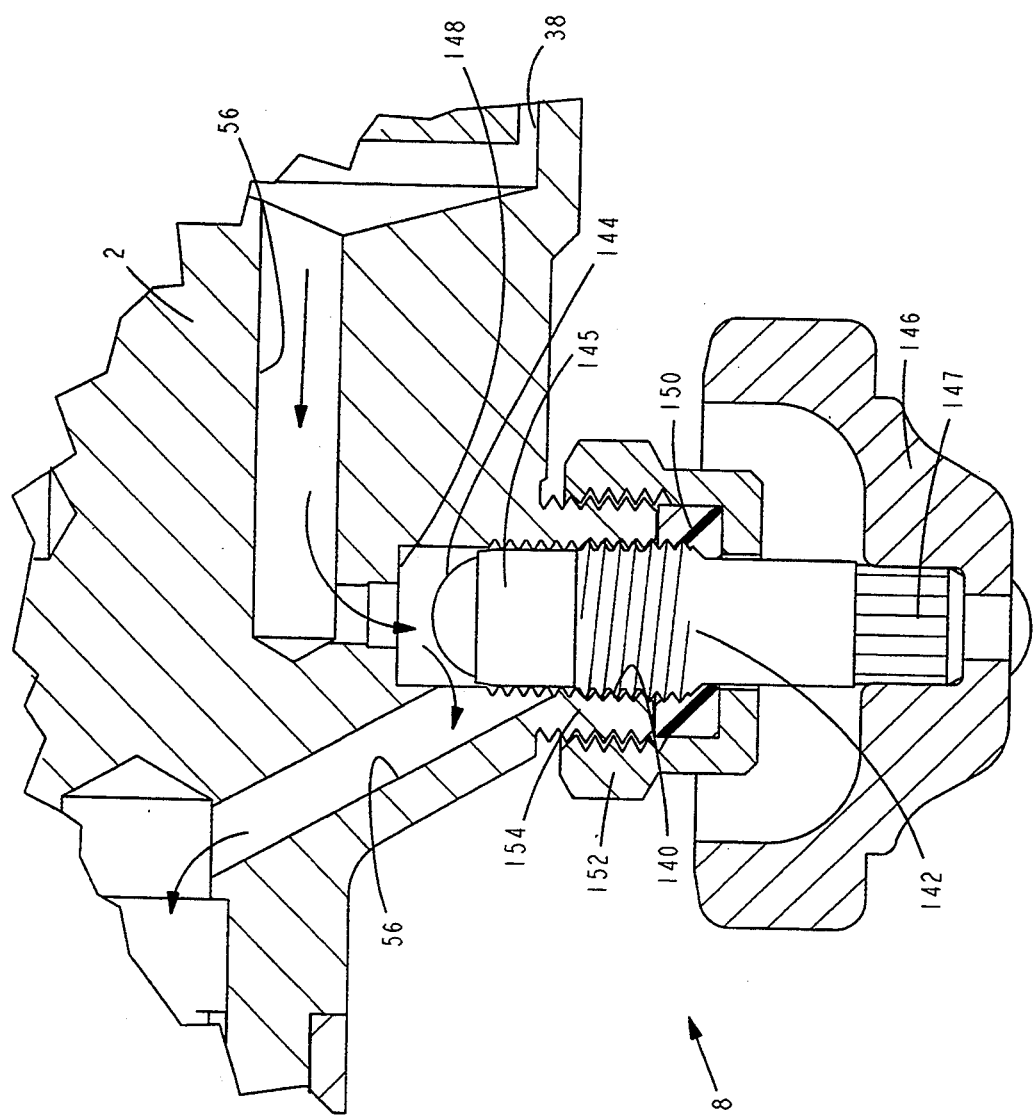
FIG. 7 is an enlarged section view of the fuel valve shown in FIG. 3.

FIG. 7 is an enlarged section view of the fuel valve assembly generally identified by the numeral 8. A fuel gas passageway 56 is formed in the body 2 allowing fluid communication between the fuel chamber 38 and the preheat fuel tube 18. A threaded port 140 is formed in the body 2 in fluid communication with the fuel gas passageway 56. An elongate threaded valve stem 142 threadably engages the port 140. A valve element 144 is formed on the first end 145 of the elongate valve stem 142 and a handle 146 is pressed to fit on the second end 147 of the elongate valve stem 142. A seat 148 is formed in the passageway 56 to sealingly engage the valve element 144. The seat 148 encircles the passageway 56. A circular elastomeric packing gland 150 encircles the valve stem 142 and is held in place by a nut 152 which threadably engages a threaded neck 154 formed on the body 2. The packing gland 150 provides a seal between the port 140 and the movable valve stem 142 thus preventing escape of fuel gas from the passageway 56. The fuel valve assembly 8 and the preheat oxygen valve assembly 10 contain the same structural components; however, they are positioned in different locations in the body 2 and they control the flow of different gases through the torch 1.

Figure 8:
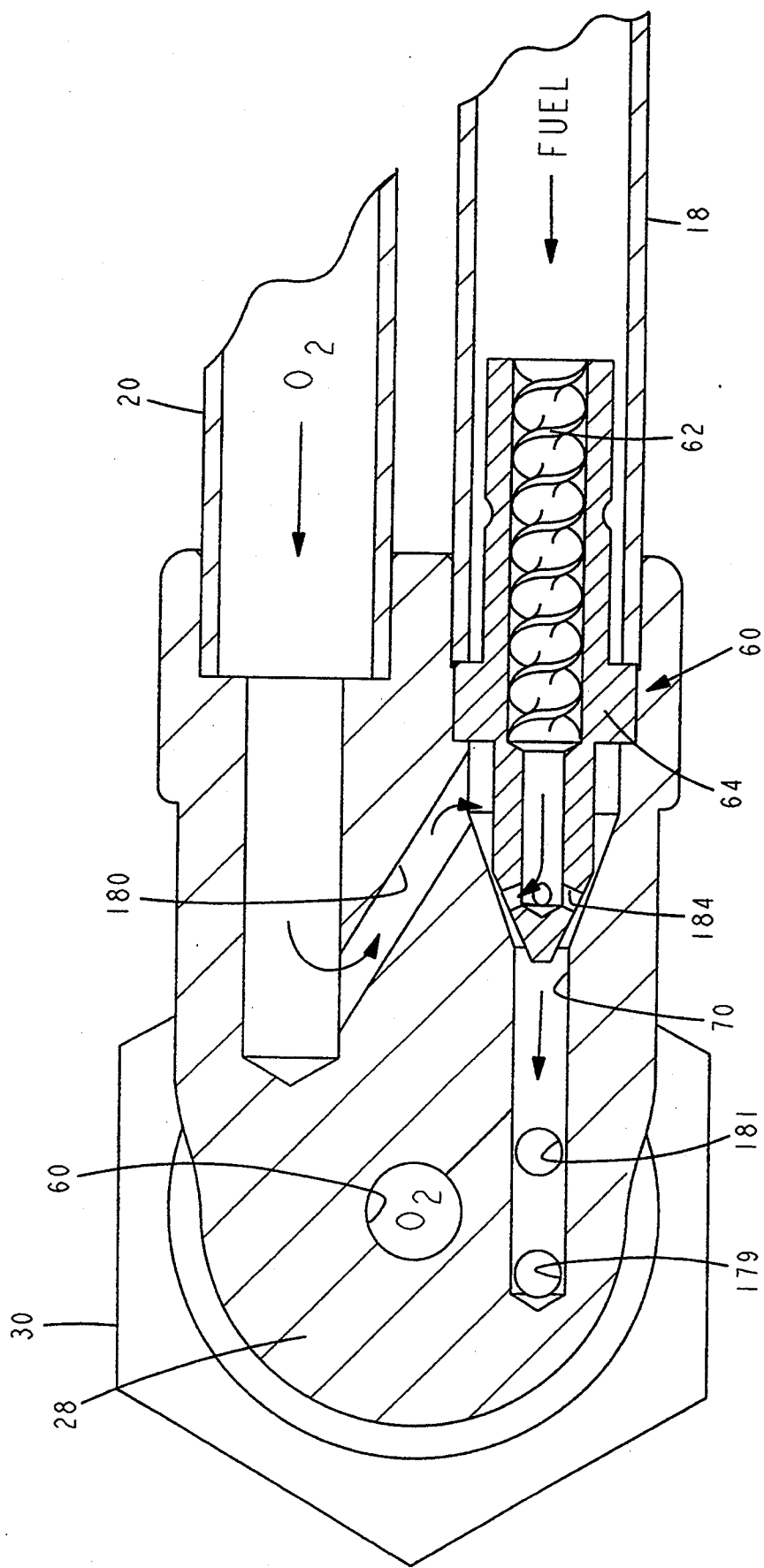
FIG. 8 is an enlarged section view of the head along the line 8—8 of FIG. 1.

FIG. 8 is a partial section view of the head 28 along the line 8—8 of FIG. 1. The preheat oxygen tube 20 and the preheat fuel tube 18 are brazed or soldered into the head 28. An oxygen passageway 180 is in fluid communication with the preheat oxygen tube 20. The oxygen passageway 180 transports oxygen into the mixed gas passageway 70. A first mixed gas down tube 179 and a second mixed gas down tube 181 transport mixed gas from the mixed gas passageway 70 to an annular ring 183 formed in the head 28, which ring then feeds the tip 32 with mixed gas.

Captured between the preheat fuel tube 18 and the head 28 is a mixer assembly 60. The mixer assembly 60 includes the mixer 64 and the spiral 62. A plurality of orifices 182, 184 and 186, are formed in one end of the mixer 60. Fuel gas passes around the spiral 62 and through the fuel orifices 182, 184 and 186. Oxygen is likewise being supplied to the mixed gas passageway 70 through the oxygen passageway 180. The fuel gas from the preheat fuel gas tube 18 and the oxygen from the preheat oxygen gas tube 20 are mixed in the passageway 70 and are delivered to the cutting tip 32 via the mixed gas passageway 70, as discussed above. The cutting oxygen passageway 66 is formed in the center of the head 28 and is in fluid communication with the cutting oxygen tube 22.

Figure 10:
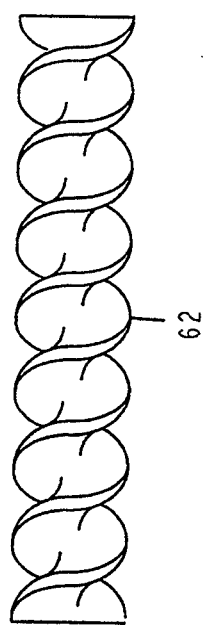
FIG. 10 is an enlarged perspective view of the spiral shown in FIG. 3.
Figure 9:
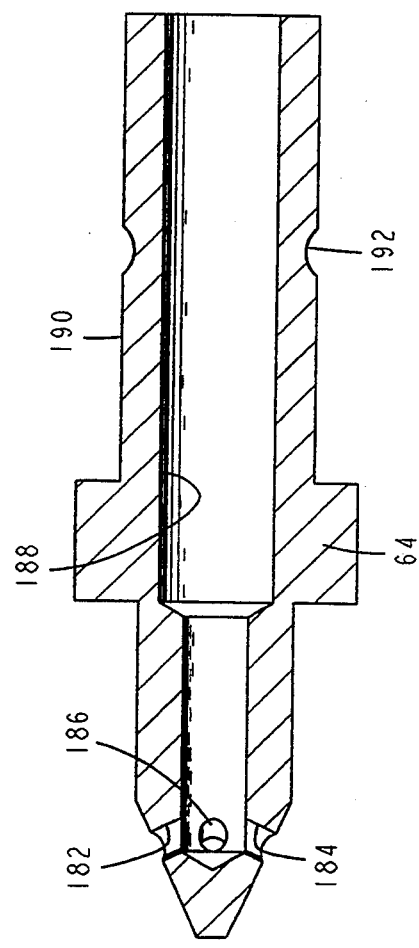
FIG. 9 is an enlarged section view of the mixer shown in FIG. 3.

FIG. 9 is an enlarged section view of the mixer 64. The fuel orifices 182, 184 and 186 are formed on one end of the mixer. A central longitudinal bore 188 passes through the mixer allowing fluid communication between the orifices 182, 184 and 186 on one end and the preheat fuel tube 18 on the other end. The spiral 62 shown in FIG. 10 fits inside of the longitudinal bore 188 and is held in place by one or more crimps 190 and 192. The purpose of the mixer assembly 60 and passageways in the head 28 are to reduce the possibility of migration of flashback from the torch 1 upstream to other components in the system as explained in detail in U.S. Pat. No. 4,409,002 which will not be repeated herein for the sake of brevity.

The fuel gas and oxygen in other types of torches are often mixed in places besides the head. For example, many torches of European manufacture mix the fuel gas and oxygen in the tip. Other torches mix the fuel gas and oxygen in the tubes running from the handle to the head. Some torches mix the fuel gas and oxygen in the handle. Applicants believe that the present invention can be used with all of the different torches described above.

Figure 11:
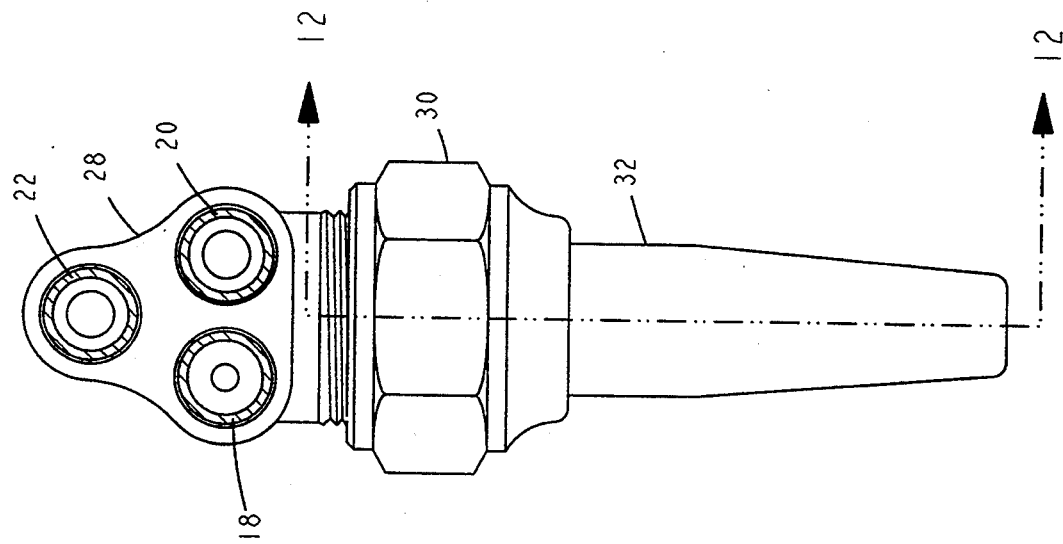
FIG. 11 is an enlarged partial section view of the tubes leading to the head of the torch along the line 11—11 of FIG. 1.

FIG. 11 is a partial section view of the tubes 18, 20 and 22 as they enter the head 28. The oxygen tube 18 enters the head 28 at the lower left hand portion thereof. Immediately to the right is the fuel tube 20. Positioned at the top of the head 28 is the oxygen cutting tube 22. Those skilled in the art will recognize that other types of cutting torches have only two tubes between the body and the head.

Figure 12:
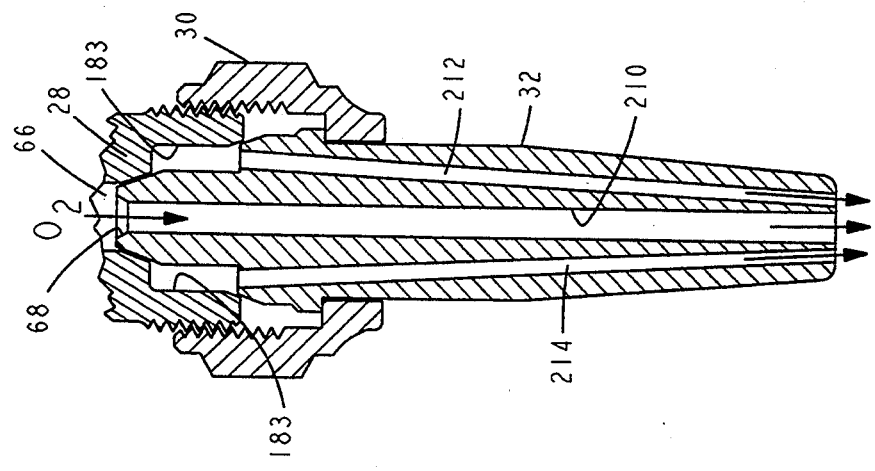
FIG. 12 is an enlarged partial section view of the cutting tip and the head of the torch along the line 12—12 of FIG. 10.

FIG. 12 is a section view of the cutting tip 32. Cutting oxygen moves through the passageway 66 in the head 28 into the cutting oxygen inlet 68 and through a central bore 210 in the tip 32. A mixture of oxygen and fuel gas enters the tip 32 from the annular ring 183 and moves down the tip through the passageways 212 and 214. Those skilled in the art will recognize that tips come in many different sizes and configurations. This tip is described as an example only. This invention is compatible with any tip, regardless of configuration or size.

Figure 13:
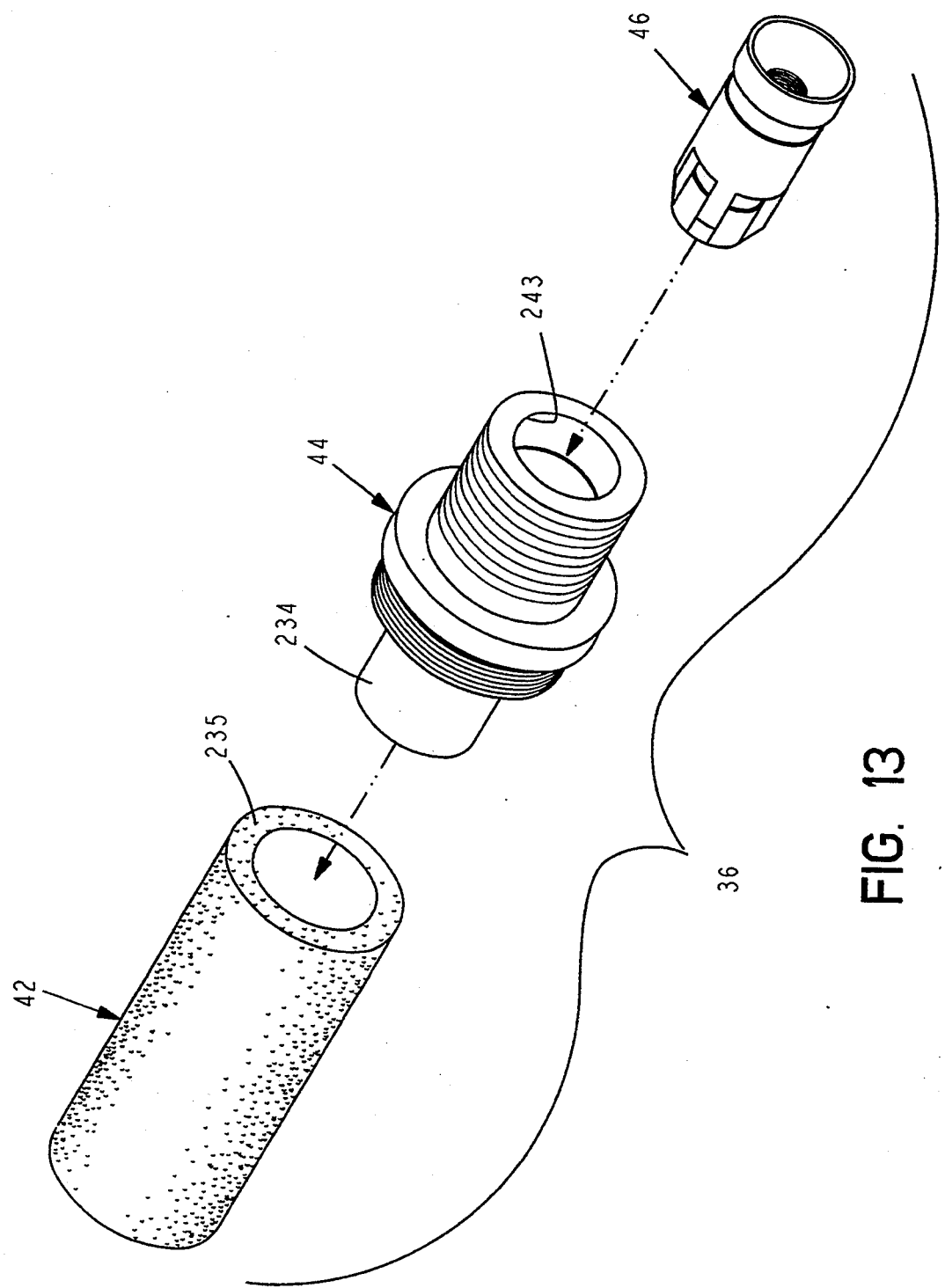
FIG. 13 is an enlarged exploded perspective view of the flashback assembly, including its three primary components, i.e., the check valve subassembly, the retainer and the porous metal flashback arrestor.

FIG. 13 is an exploded enlarged view of the oxygen flashback assembly 36 which consists of three primary components: a porous metal flashback arrestor 42, the retainer 44 and the check valve subassembly 46. The fuel flashback assembly 40 is construed identically to the oxygen flashback assembly 36 as shown in this figure; however the respective flashback assemblies are located in different chambers in the body of the torch and fuel flashback assembly contains left-hand threads.

Figure 14:
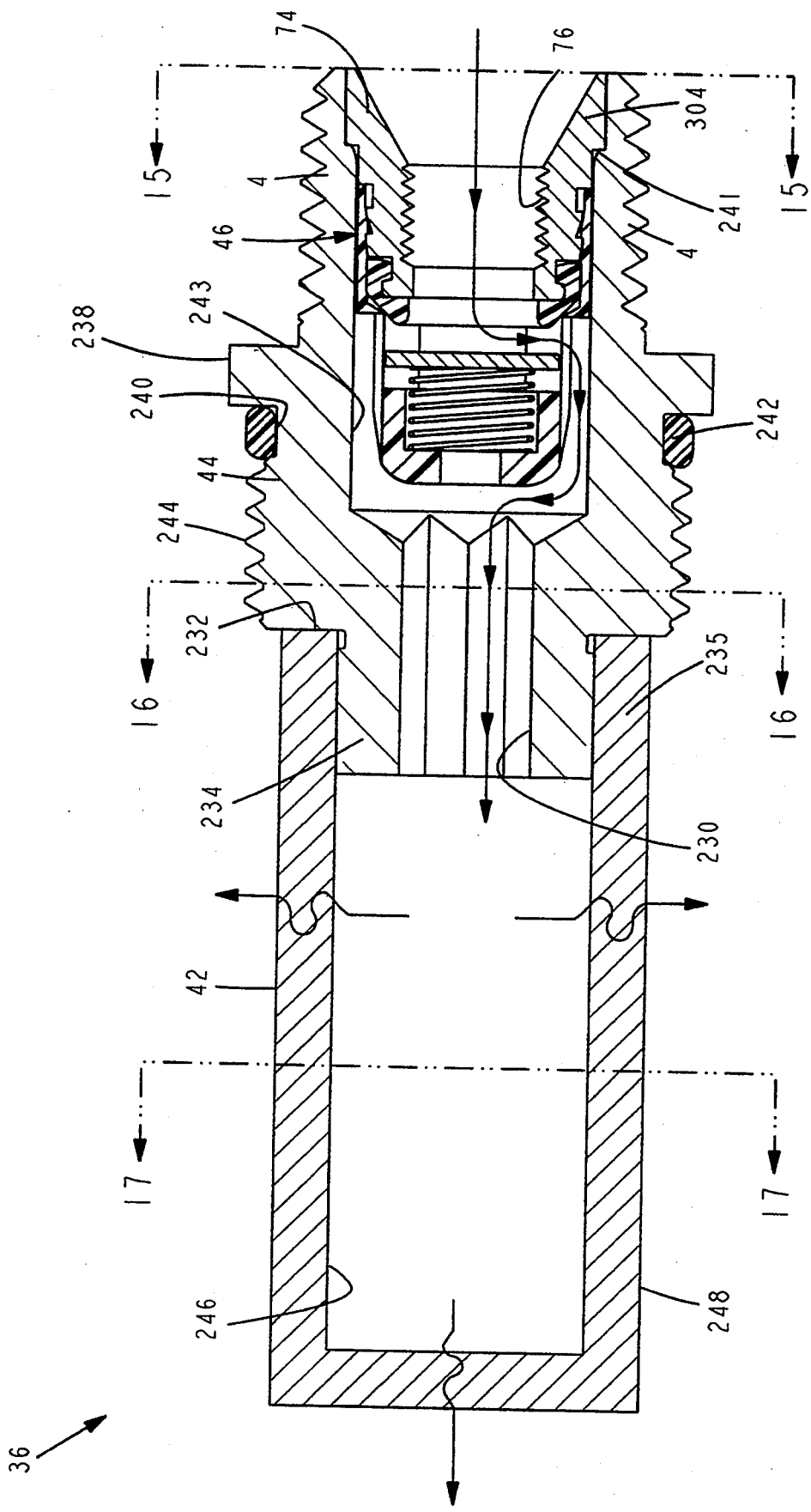
FIG. 14 is an enlarged section view of the flashback assembly.

FIG. 14 is a section view of the oxygen flashback assembly 36 shown in FIG. 13. Again, the three primary components are the porous metal flashback arrestor 42, the retainer 44 and the oxygen check valve subassembly 46.

The porous metal flashback arrestor 42 is manufactured from powdered stainless steel and is sintered to form an elongated cup-like structure as shown in the drawing. The porous metal flashback arrestor 42 is permeable to gas and forms tortuous pathways therethrough as indicated by the curved flow arrows in the drawing. The purpose of the porous flashback arrestor 42 is to reduce the possibility that a flamefront will pass through the arrestor 42 and migrate upstream of the torch into other components in the system.

Those skilled in the art will recognize that the porous metal flashback arrestor 42 can be manufactured in a number of different shapes which are within the scope of this invention. For example, a solid disc or rod may be suitable in equivalent designs. A seamless tube, flat sheet, cone shaped member or annular band may be suitable in other equivalent designs. The shape of the porous metal flashback arrestor is not the important feature. The ability of the arrestor to quench, in most circumstances, a flamefront during a flashback is the key design criteria.

In one embodiment which Applicants have successfully tested, the flashback arrestor 42 will stop particles 6 microns or larger. The sintered arrestor 42 used by applicants is an off-the-shelf item, purchased from Mott Metallurgical Corporation of Farmington, Conn. It has a bubble test of approximately 12 inches of water. The wall thickness of the arrestor 46 is approximately 0.100". Other sizes and types of arrestors are suitable for this invention, depending on required flow rates and other factors known to those skilled in the art.

The retainer 44 includes a hexagonal central bore 230 which allows gas to pass through the retainer as shown by the flow arrows in the drawing. The hexagonal bore 230 facilitates easy installation and removal of the retainer 44 and the arrestor 42 from the body 2 with an allen wrench. A shoulder 232 is formed adjacent the neck 234 of the retainer 44. The porous metal flashback arrestor 42 is sized and dimensioned to abut the shoulder 232 and is pressed to fit on the neck 234. This press fit forms a gas-tight seal between the retainer 44 and the open end 235 of the porous flashback arrestor 42. The check valve subassembly 36 is pressed to fit in the bore 243 of the hose connector 4. This press fit forms a gas-tight seal between the retainer 44 and the check valve subassembly 46.

The oxygen hose connector 4 is threadably formed on one end of the retainer opposite the neck 234. In the preferred embodiment, the oxygen hose connector 4 and the neck 234 are formed from and are a part of the retainer 44. Those skilled in the art will recognize that this design could easily be manufactured from two, three or more parts which are equivalent and within the scope of this invention. A circumferential flange 238 is formed near the center of the retainer 44 adjacent an O-ring groove 240 which receives the O-ring 242. A plurality of threads 244 encircle the outer diameter of the retainer 44 and threadably engage the body 2 holding the oxygen flashback assembly 36 in place. The purpose of the O-ring 242 and the circumferential flange 238 is to provide a gas-tight seal to prevent escape of oxygen from the body.

As previously mentioned, the fuel flashback assembly 40 contains the identical elements previously described in the oxygen flashback assembly 36 except the left-hand threads.

Figure 15:
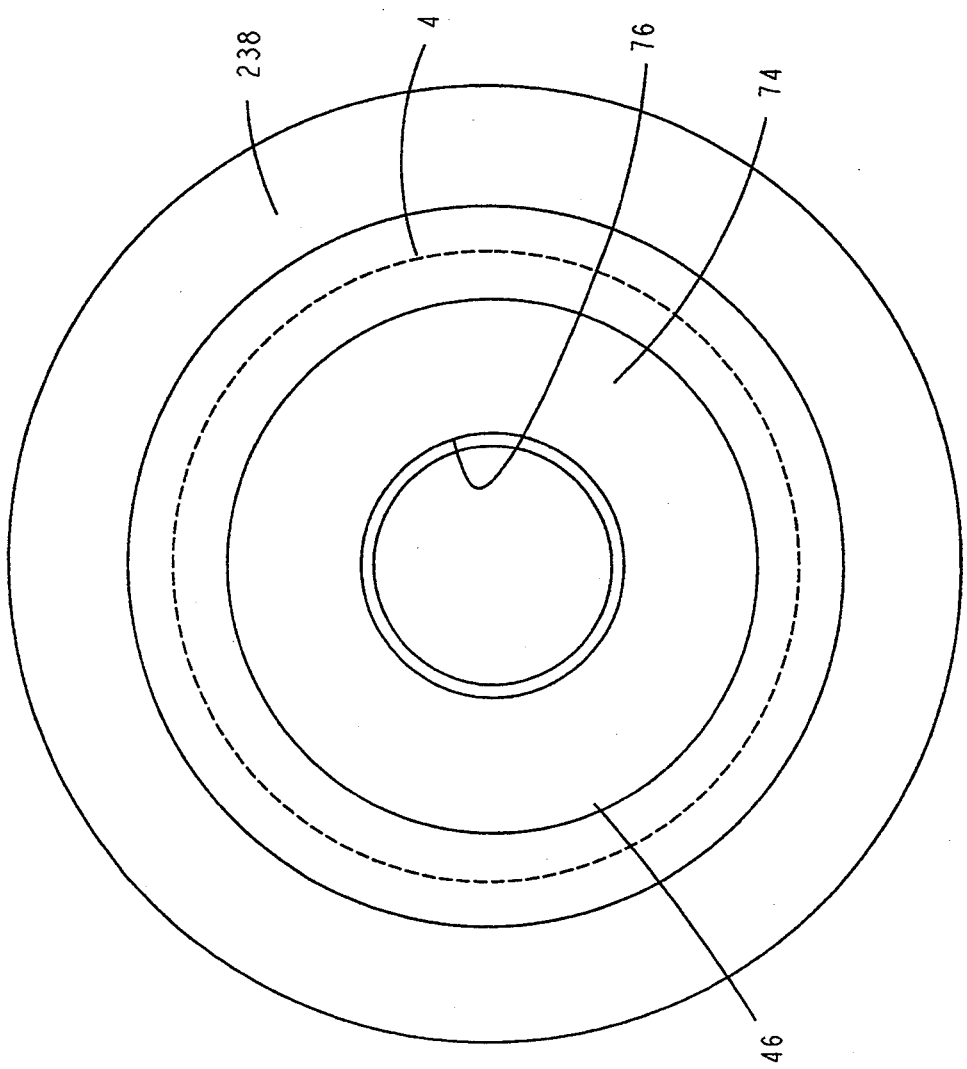
FIG. 15 is an end view of the flashback assembly along the line 15—15 of FIG. 13.

FIG. 15 is an end view of the oxygen flashback assembly 46 along the line 15—15 of FIG. 14. In the center of this figure is the oxygen inlet bore 76 which allows oxygen to pass from the oxygen hose 5 through the check valve subassembly 46, the retainer 44, the porous metal flashback arrestor 42 and into the torch body 2. Surrounding the oxygen inlet bore 76 is the body 74 of the check valve subassembly 46. The oxygen inlet bore 76 is threaded to facilitate easy installation and removal of the oxygen check valve subassembly 46. To remove the oxygen check valve subassembly 46, a bolt or other compatible threaded device is threaded clockwise into the oxygen inlet bore 76. A sharp pull removes the oxygen check valve subassembly 46 from the retainer 44. Next, an allen wrench is inserted in the hexagonal bore 230 and rotated counterclockwise to unscrew the flashback assembly 36 from the body 2. To install a new flashback assembly 36, the above process is reversed. To remove the fuel check valve subassembly 52, a bolt or other compatible threaded device is threaded clockwise into the inlet bore. A sharp pull removes the fuel check valve subassembly 52 from the retainer. Next an allen wrench is inserted in the hexagonal bore and rotated clockwise to unscrew the fuel flashback assembly 40. To install a new fuel flashback assembly 40, the above process is reversed.

The oxygen hose connector 4 is a threaded member as indicated by the phantom line in the drawing. The hexagonal bore 230 enlarges to a circular bore 243 on the inside of the oxygen hose connector 4. The bore 243 is sized and dimensioned to receive the check valve subassembly 46 in a pressed fit.

Figure 16:
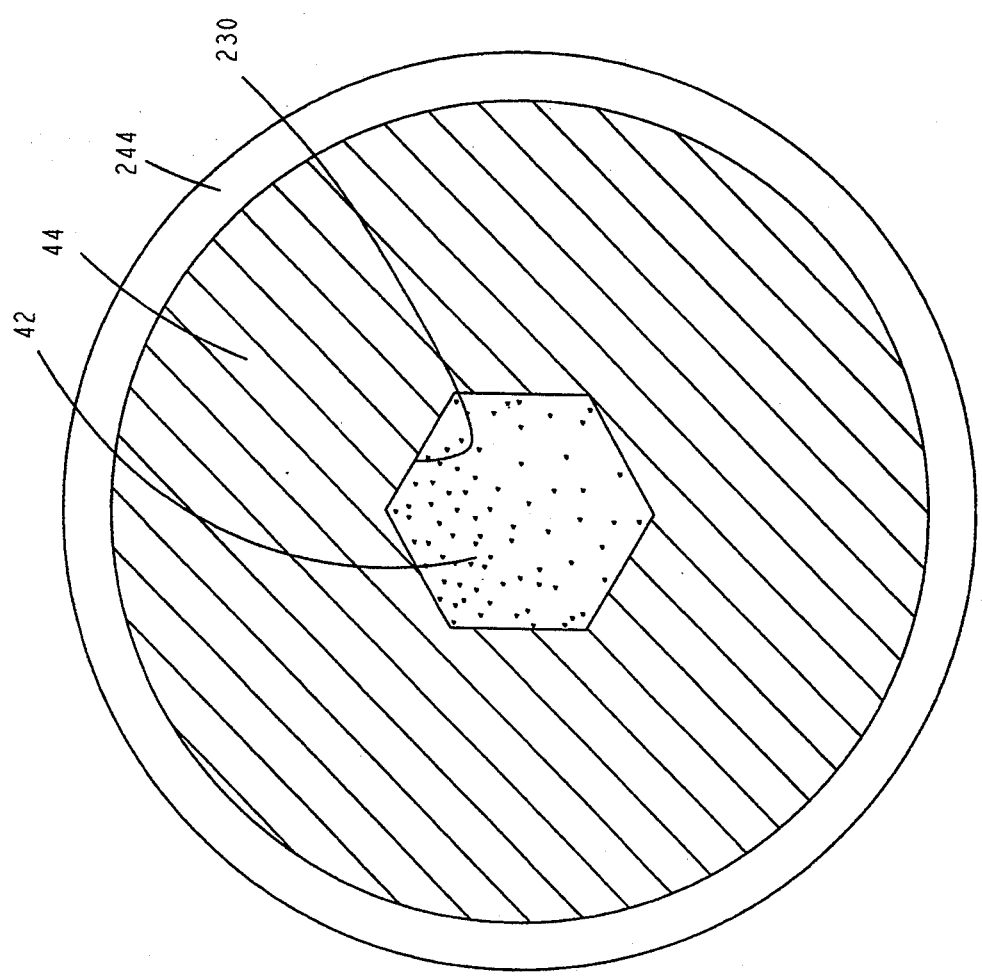
FIG. 16 is a section view of the retainer along the line 16—16 of FIG. 13.

FIG. 16 is a section view of the retainer 44 along the line 16—16 of FIG. 14. In the center of this drawing is the hexagonal central bore 230 which passes through the retainer 44. The dots in the center of this hexagonal drawing indicate the porous metal flashback arrestor 42 which can be seen through the hexagonal bore 230. The threads 244 encircle the retainer 44 to threadably engage the body 2.

Figure 17:
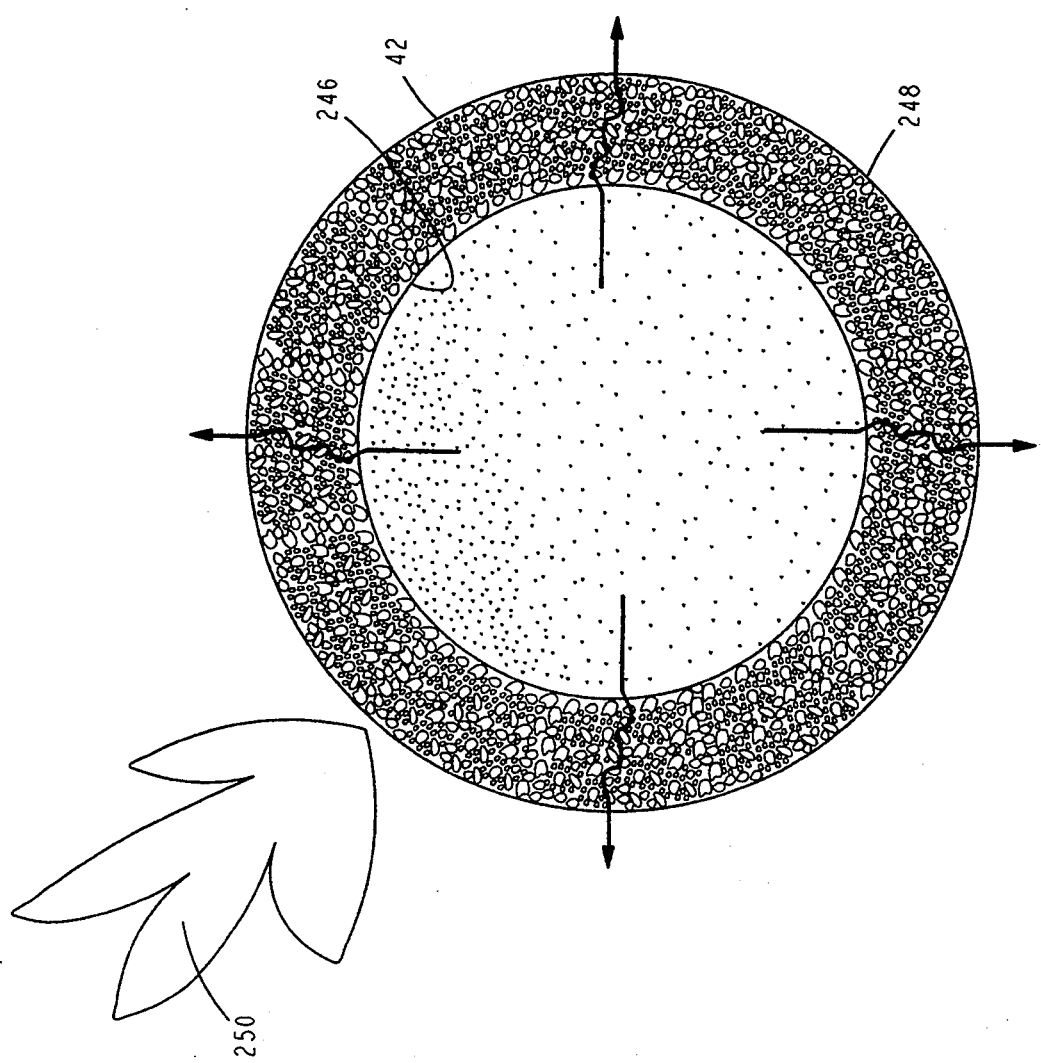
FIG. 17 is a section view of the porous metal flashback arrestor along the line 17—17 of FIG. 13.

FIG. 17 is a section view of the porous metal flashback arrestor 42 along the line 17—17 of FIG. 14. This drawing is intended to be a diagrammatic representation of the pore configuration of the porous metal flashback arrestor 42 and is not an exact pictorial representation of the physical embodiment. As previously discussed, the arrestor 42 is formed from powdered metal which is sintered into a cap-like structure. Stainless steel is used in the preferred embodiment; however, other metals may also be suitable for this application and are within the scope of this invention. Gas can pass from the interior 246 to the exterior 248 of the powdered metal flashback arrestor 42 through numerous tortuous pathways as indicated by the curved flow arrows in the drawing during normal operation of the torch. In the event of a flashback, the flamefront will attempt to pass from the exterior 248 through the tortuous pathways to the interior 246 of the flashback arrestor 42 as indicated by the large flamefront arrow 250 in the drawing. The porous metal flashback arrestor 42 is designed to quench the flamefront as it passes through the arrestor 42, in most situations, and reduce the possibility that the flashback will migrate from the torch 1 upstream into the hose or other components in the system. As previously mentioned, the porous metal flashback arrestor 42 does not prevent a flashback from occurring. In some circumstances, the flamefront may pass through the flashback arrestor 42 and migrate upstream to other components in the system.

Figure 18:
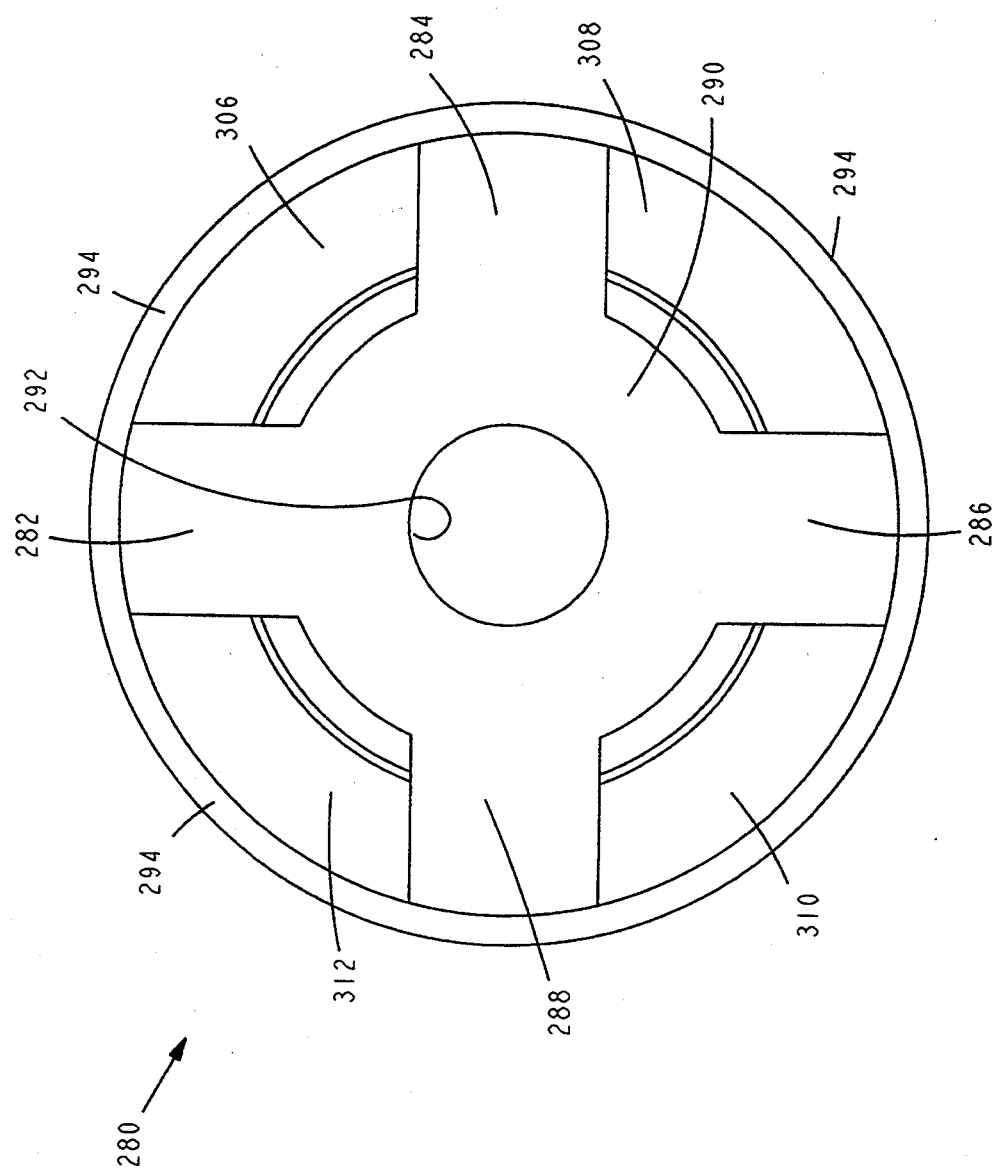
FIG. 18 is an end view of the guide which is a component in the check valve subassembly.

FIG. 18 is a front view of the guide 280 which is a part of the check valve subassembly 46. In the preferred embodiment, the guide 280 is an injection molded part formed from a thermoplastic such as high density polyethylene. The guide 280 includes a first finger 282, a second finger 284, a third finger 286 and a fourth finger 288. These fingers extend from a base 290 to a circular connector 294 which engages a plurality of barbs 296 and 298 formed about the body 74 of the check valve subassembly 46. A bore 292 passes through the base 290.

A first peripheral vent 306 is formed between the first finger 282 and the second finger 284. A second peripheral vent 308 is formed between the fingers 284 and 286. A third peripheral vent 310 is formed between the third finger 286 and the fourth finger 288. A fourth peripheral vent 312 is formed between the fourth finger 288 and the first finger 282. The first peripheral vent 306, the second peripheral vent 308, the third peripheral vent 310 and the fourth peripheral vent 312 are all in fluid communication with the oxygen inlet bore 76 of the body 74 of retainer 44. The oxygen check valve assembly 46 is open during normal operation of the torch and gas passes from the oxygen hose 5 through the oxygen inlet bore 76 and out the peripheral vents 306, 308, 310 and 312 into hexagonal passageway 230 of the retainer 44. Gas then flows through the tortuous pathways in the porous metal flashback arrestor 42 into the oxygen chamber 34 of the body 2.

Figure 19:
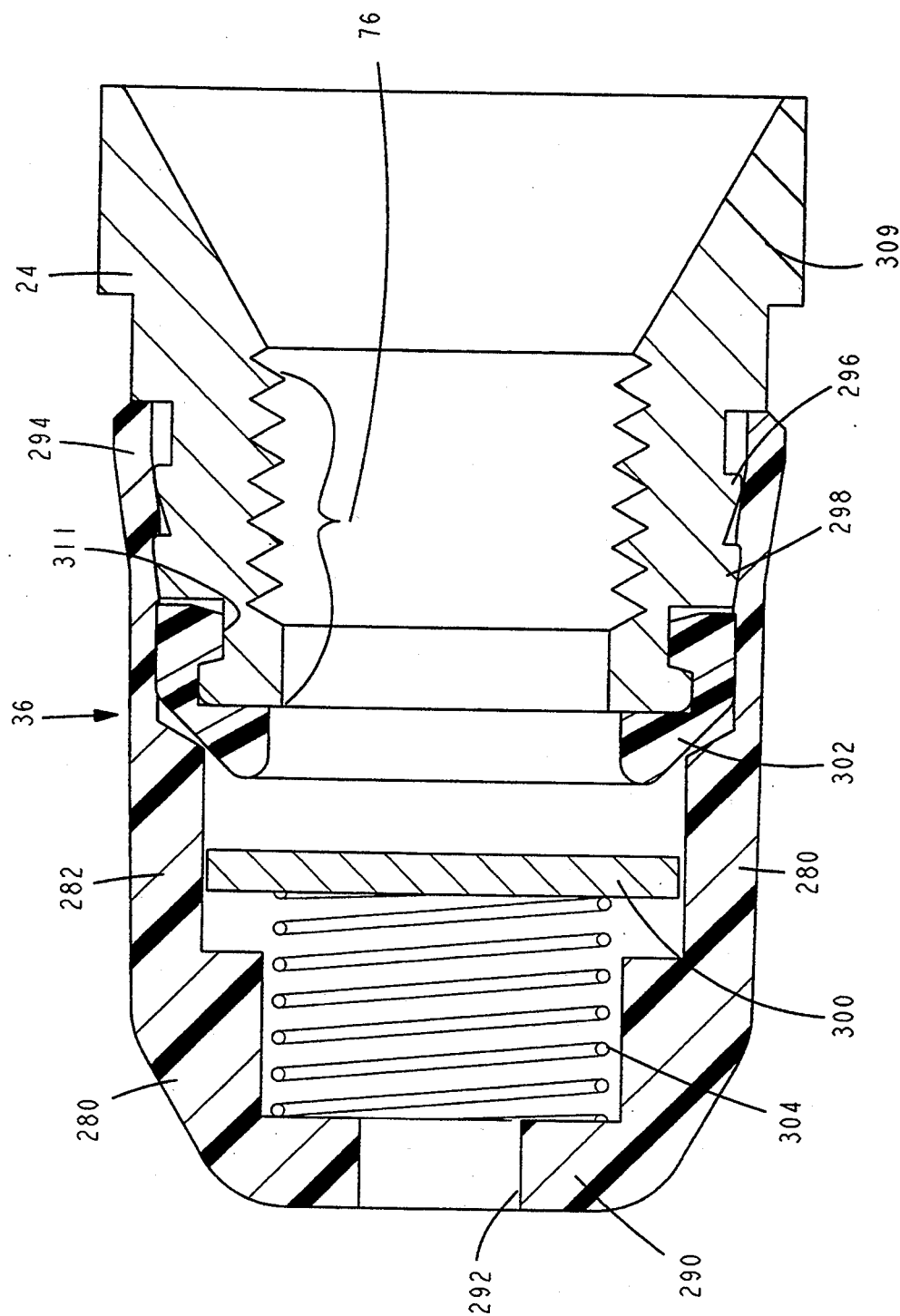
FIG. 19 is an enlarged section view of the check valve assembly shown in FIG. 14.

FIG. 19 is an enlarged section view of the oxygen check valve subassembly 46. Structurally, it is identical to the fuel check valve subassembly 52. A body 74 defines an oxygen inlet bore 76 which is threaded to facilitate easy installation and removal of the subassembly 46 from the assembly 36. A recessed channel 311 is formed on a first end of the body 74 and a flange 309 is formed on the opposite end. Barbs 296 and 298 are disposed about the exterior of the body 74 between the flange 309 and the recessed channel 311. The barbs 296 and 298 are sized and dimensioned to engage the circular connector 294 of the guide 280 and hold the guide 280 in position relative to the body 74. The flange 309 is sized and dimensioned to seal against a shoulder 241 in the bore 243 of the hose connector 4.

A movable valve element 300 is positioned adjacent a seat 302. A spring 304 is positioned between the base 290 of the guide 280 and the movable valve element 300. The movable valve element 300 is a disc shaped structure which is guided into engagement with the seat 302 by fingers 282, 284, 286 and 288. During normal operation of the torch, the check valve subassemblies 46 and 52 are in the open position as shown in FIG. 18.

Operation of an Oxy-acetylene Cutting Torch

The operation of the oxy-acetylene cutting torch 1 will be well known to one skilled in the art. First, the fuel gas valve assembly 8 is opened and the acetylene is lit with a striker positioned near the tip 32 of the torch. The initial flame is orange and produces black smoke. Next, the oxygen valve assembly 10 is opened to neutralize the flame which becomes light blue and the black smoke ceases. The cutting oxygen valve assembly 12 is then placed in full open and the flame may then be further adjusted with the oxygen valve assembly 10. After the flame has been fully neutralized, the cutting oxygen valve assembly 12 is closed. The preheat blue flame is placed next to a ferrous piece of metal until it glows and forms a molten pool. The cutting oxygen valve assembly 12 is then placed in full open which oxidizes the metal and makes the cut.

Figure 20:
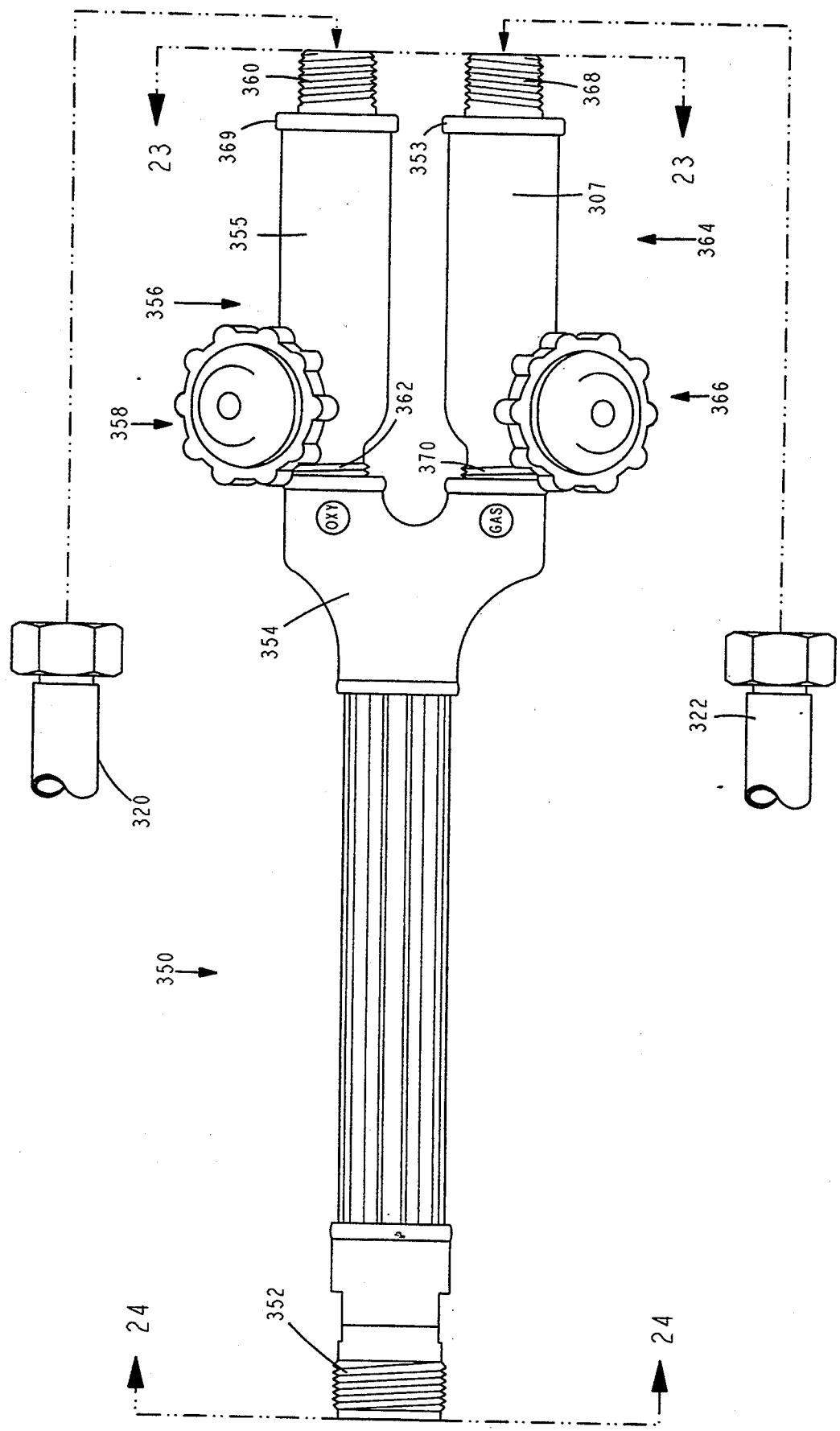
FIG. 20 is a top elevation view of a multi-purpose torch handle to which various types of attachments can be connected for cutting, welding, soldering, brazing or heating.

FIG. 20 is an elevation view of a multi-purpose torch handle 350 generally identified by the numeral 350. This torch handle includes a cone end 352 which can threadably receive a variety of different accessories including, but not limited to, a cutting assembly for cutting ferrous metal and a welding assembly which can be used for welding, brazing, and/or heating.

A first elongate cartridge 356 includes, inter alia, an oxygen valve assembly 358 and a housing 355 which defines an interior chamber 357 which receives a portion of the first removable oxygen flashback assembly 372. The oxygen hose connector 360 threadably engages the oxygen hose 320. A threaded oxygen hose connector 360 extends from and forms a part of the oxygen flashback assembly 372. A threaded neck 362 extends from and forms a part of the housing 355. The neck 302 engages the body 354. Inside of the housing 355 is a gas passageway 406 which allows gas to flow from the oxygen hose connector 360 through the interior chamber 357 past the oxygen valve assembly 358 and through the neck 362 into the body 354 of the torch handle 350.

The second elongate cartridge 364 includes inter alia, a fuel valve assembly 366 and a housing 367 which defines an interior chamber 365 which receives a portion of the second removable fuel flashback assembly 366. The fuel gas hose connector 368 threadably engages the fuel gas hose 322. A threaded fuel gas hose connector 368 extends from and forms a part of the fuel gas flashback assembly 366. A threaded neck 370 extends from and forms a part of the housing 367. The threaded neck 370 threadably engages the body 354. The second elongate cartridge 364 defines a fuel gas passageway 418 that allows gas to pass from the fuel gas hose connector 368 through the chamber 365 past the fuel gas valve assembly 366 and through the neck 370 into the body 354 of the torch handle 350.

Figure 21:
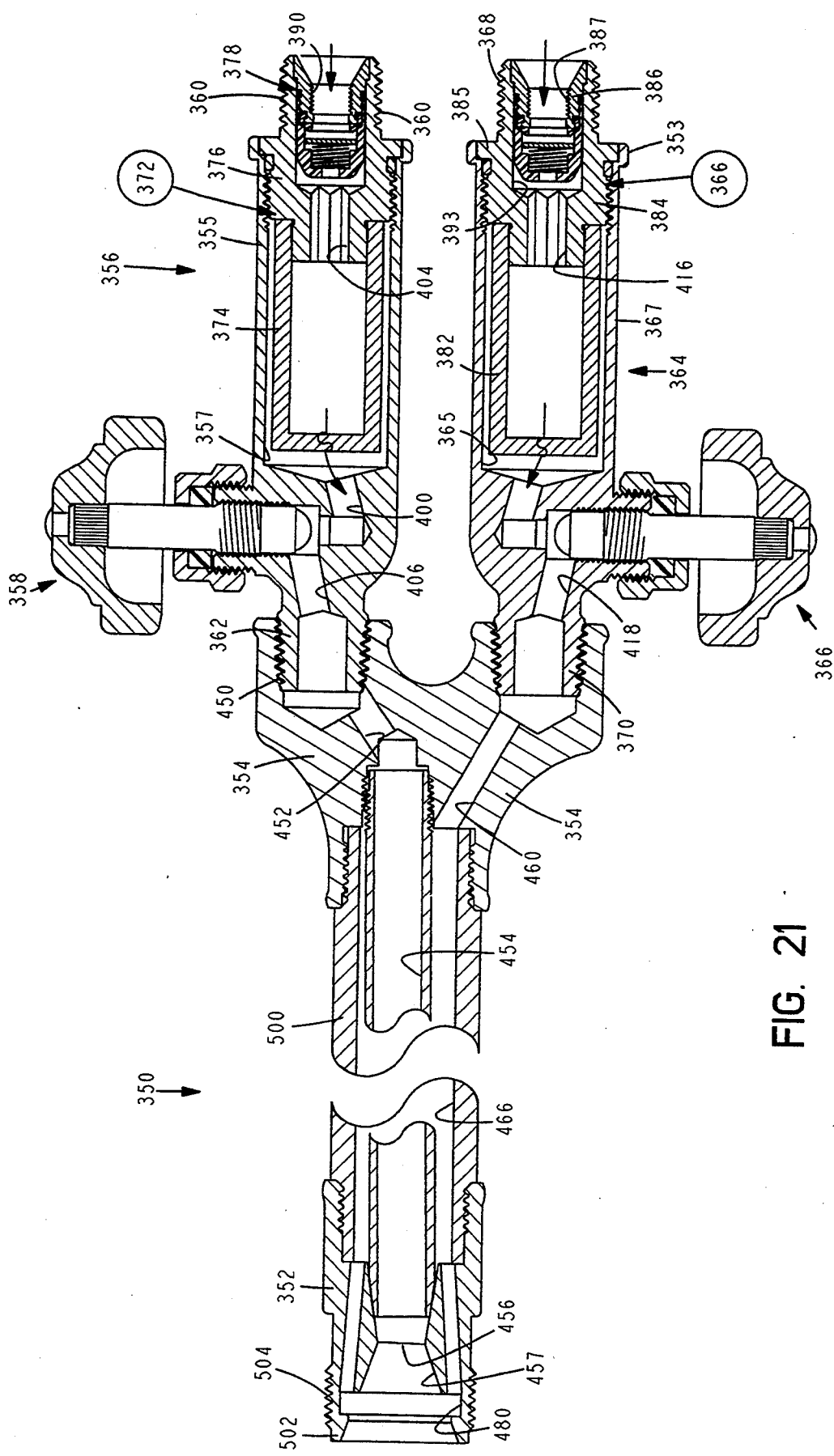
FIG. 21 is a partial section view of the multi-purpose torch handle shown in FIG. 20 with the oxygen valve and the fuel valve rotated slightly along the line 21—21 of FIG. 23 to clarify the flow passages in the drawing.

FIG. 21 is a section view of the torch handle 350 shown in FIG. 20 with the valve assemblies 358 and 366 rotated slightly to better show the flow passages for the gas. The first cartridge 356 defines an oxygen chamber 357 which is sized and dimensioned to receive a portion of the oxygen flashback assembly 372 which includes three primary components as follows: a porous metal flashback arrestor 374, a retainer 376 and a check valve subassembly 378. The oxygen flashback assembly 372 is identical to the flashback assembly 36 shown in FIG. 3 except that it is used in a different type of torch handle.

The second cartridge 364 defines a fuel chamber 365 which is sized and dimensioned to receive a portion of the fuel flashback assembly 366 which includes three primary components as follows: a porous metal flashback arrestor 382, a retainer 384 and a check valve subassembly 386. Likewise, the fuel flashback assembly 366 is identical to the fuel flashback assembly 40 shown in FIG. 3 except that it is used in a different type of torch handle.

The body 354 includes a first port 450 which threadably receives the neck 362 of the first cartridge 356. An oxygen passageway 452 is formed in the body 354 and is in fluid communication with the oxygen passageway 406 of the first housing 355. The oxygen passageway 452 connects to an elongate oxygen tube 454 in the torch handle 350. The oxygen tube 454 connects to an oxygen outlet port 456 which defines a seat 457. The seat 457 seals against an O-ring, on an attachment, not shown in the drawing, which attachment threadably engages the cone end 352.

A fuel passageway 460 is formed in the body 354 and is in fluid communication with the fuel passageway 418 of the housing 364. A barrel 500 extends from the body 354 to the cone end 352. The elongate barrel 500 surrounds the elongate oxygen tube 454 and defines an annular fuel passageway 466. The cone end 352 defines a fuel gas outlet port 480 and a seat 502. The fuel passageway 460 in the body 454 is in fluid communication with the annular fuel passageway 466 and the fuel outlet port 480. The seat 502 seals against a second O-ring on an attachment, not shown in the drawing, which attachment threadably engages the cone end 352.

The flow passage for oxygen is as follows: the oxygen hose 320 connects with the oxygen hose connector 360. Oxygen flows from the hose through the elongate oxygen inlet bore 390 of the check valve subassembly 378. During normal operation of the torch, the check valve subassembly 378 is open, allowing oxygen to pass into the hexagonal bore 404 and through the tortuous pathways in the porous metal flashback arrestor 374 and into the oxygen chamber 357. The oxygen then flows through the passageway 406 past the oxygen valve assembly 358 out of the neck 362 into the passageway 452 of the body 454. The oxygen then flows through the oxygen tube 454 to the oxygen outlet port 456 which engages various types of accessory attachments, such as a cutting attachment.

The flow path for the fuel gas is as follows: the fuel gas hose 322 connects to the fuel hose connector 368. The fuel gas passes from the hose through the fuel gas inlet bore 387 in the check valve assembly 386. During normal operation of the torch, the check valve subassembly 386 is open and the fuel gas passes through the hexagonal bore 416 through the tortuous pathways in the porous metal flashback arrestor 382 into the fuel gas chamber 365 of the housing 367. The gas continues to flow through the passageway 418 past the fuel valve assembly 366 out of the neck 370 into the internal passageway 460 of the body 354. The fuel gas then flows through the annular area 466 to the fuel gas outlet port 480 which engages various types of accessories, such as a cutting attachment.

Figure 22:
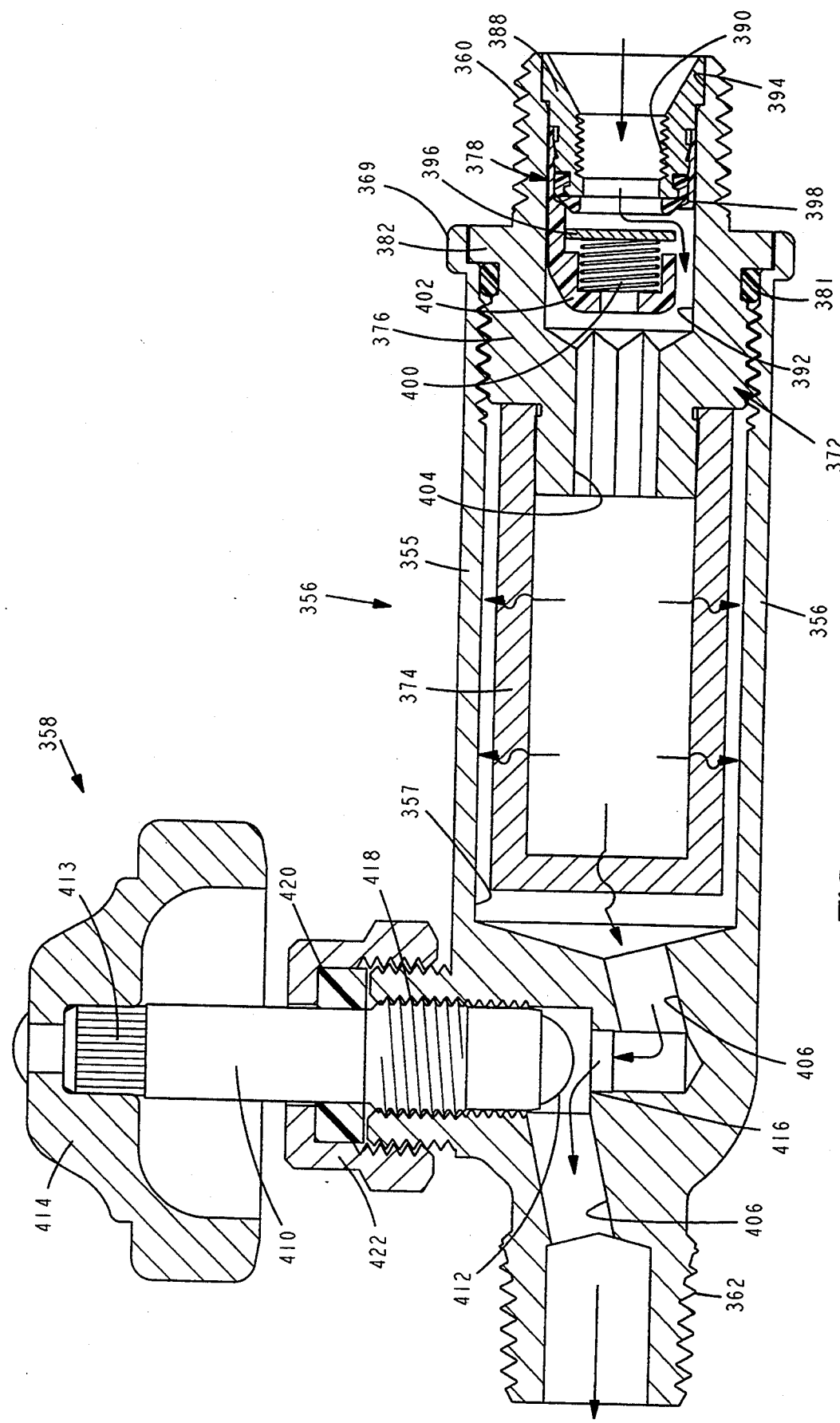
FIG. 22 is an enlarged view of the removable cartridge with internal flashback assembly shown in FIG. 21.

FIG. 22 is an enlarged section view of the first removable elongate cartridge 356. Again, the oxygen flashback assembly 372 is configured identically to the oxygen flashback assembly 36 shown in FIG. 13 except that it is positioned in a different type of torch handle. The check valve subassembly 378 includes a body 388 which defines an oxygen inlet bore 390 passing therethrough. The oxygen inlet bore 390 is in fluid communication with the oxygen hose 320. The check valve subassembly 378 is pressed to fit inside of an enlarged bore 392 which is formed on the interior of the oxygen hose connector 360. A flange 394 extends from the exterior of the body 388. This flange 394 forms a gas-tight seal with the enlarged bore 392 of the hose connector 360.

Oxygen passes from the oxygen hose 320 into the oxygen inlet bore 390 of the check valve subassembly 378. During normal operation of the torch, the valve element 396 does not engage the seat 398 because the force of the gas pressure being exerted against the valve element 396 is greater than the amount of force exerted in the opposite direction by the spring 400. Like the other check valve subassemblies described herein, the subassembly 378 is designed to close when oxygen hose pressure drops to 0 PSI. During normal operation of the torch, the gas then passes through the peripheral vents as indicated by the curved flow arrows in the drawing. The gas then flows through the hexagonal bore 404 and works its way through the tortuous pathways in the porous metal flashback arrestor 374 into the oxygen chamber 357 as indicated by the flow arrows in the drawing. The oxygen then passes through an internal passageway 406 formed in the first cartridge 356 past the oxygen valve assembly 358 and into the neck 362 of the first housing assembly 356. The oxygen then enters other passageways in the body 354 of the handle 350 as described above.

An elongate valve stem 410 defines a movable valve element 412 on one end and a knurl 413 on the other end. The knurl 413 receives a handle 414. A valve seat 416 encircles the passageway 406 of the first cartridge 356.

The threaded valve stem 410 threadably engages a port 418 formed in a portion of the first housing 355. A packing gland 420 surrounds the elongated valve stem 410 and is held in place by a packing nut 422. The oxygen valve assembly 358 and the fuel gas valve assembly 366 are configured in an identical manner to the oxygen valve assembly 10 and the fuel gas valve assembly 8, respectively, as described herein.

Figure 23:
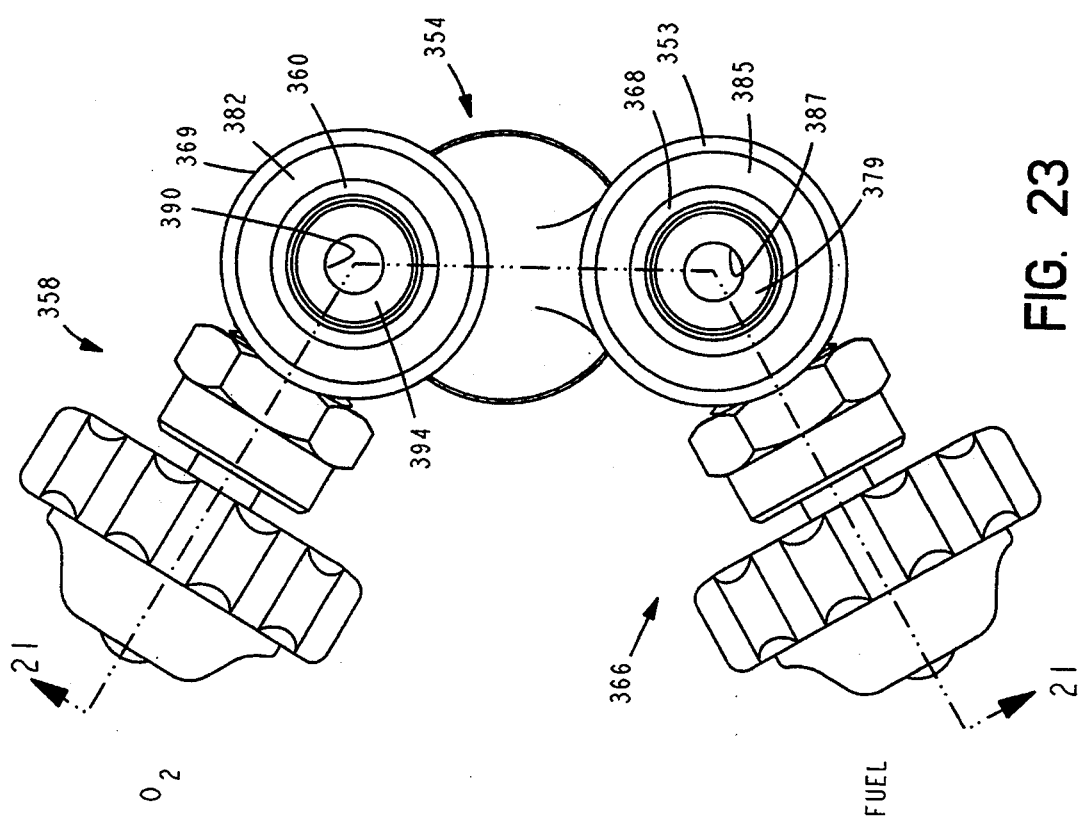
FIG. 23 is a rear end view of the torch handle along the line 23—23 of FIG. 20.

FIG. 23 is an end view of the torch handle 350 along the line 23—23 of FIG. 20. The oxygen valve assembly 358 is positioned towards the top of the drawing and the fuel gas valve assembly 366 is positioned towards the bottom of the drawing. Intermediate of these two valves is the body 354. The housing 355 enlarges to form a rim 369 on the end opposite from the neck 362. The circumferential lip 382 of the retainer 376 abuts a recess in the rim 369. An O-ring 381 is captured between the lip 382 and housing 355 forming a gas-tight seal to prevent oxygen from escaping from the oxygen chamber 357. The oxygen hose connector 360 extends beyond the housing 355. The body 394 of the check valve subassembly 378 fits in the bore 392 inside the oxygen hose connector 360. In the center of the body 394 is an oxygen inlet bore 390 which is in fluid communication with the oxygen hose.

The second housing 367 enlarges to define a rim 353. The retainer 384 enlarges to define a circumferential lip 385 which abuts a recess in the rim 353. The check valve subassembly 379 includes a body 386 which defines a fuel gas inlet bore 387 in fluid communication with the fuel gas hose. The check valve subassembly 379 is pressed to fit inside the bore 393 inside the fuel hose connector 368.

Figure 24:
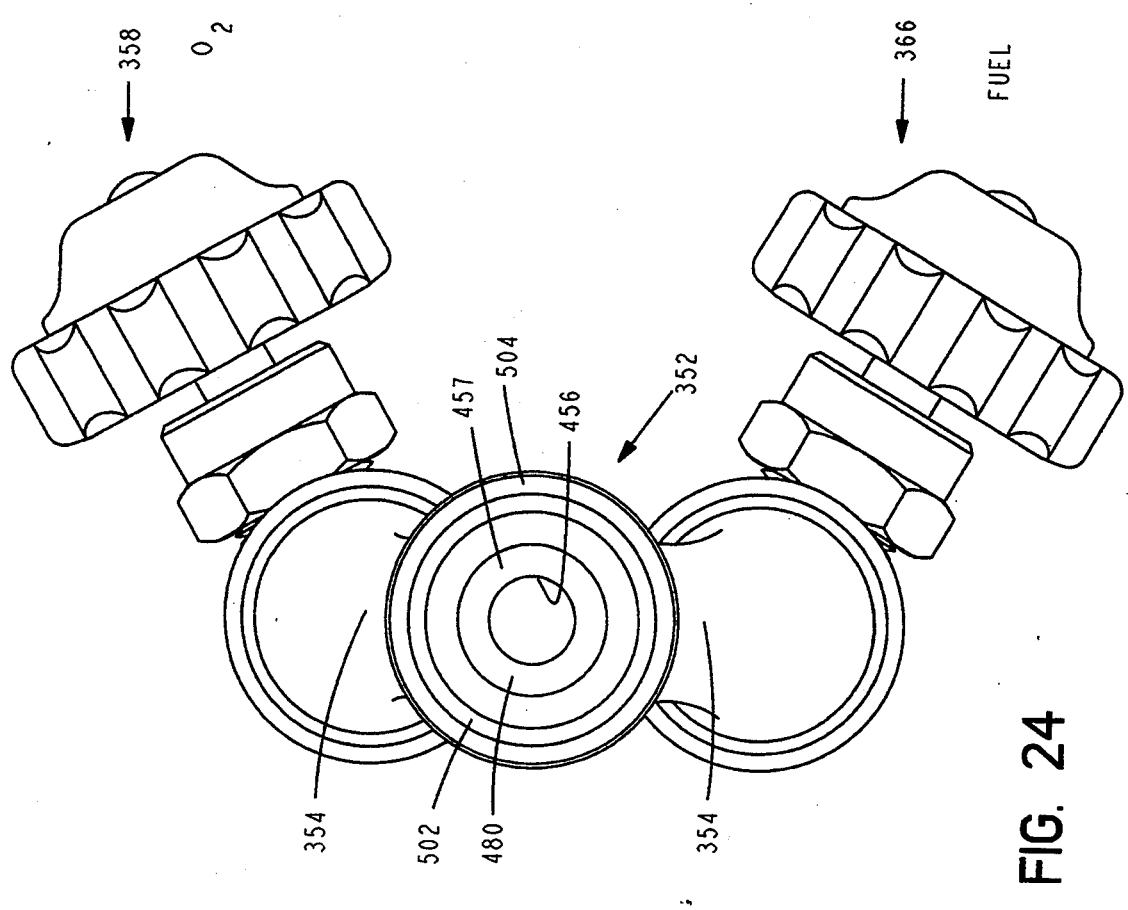
FIG. 24 is a front end view of the torch handle along the line 24—24 of FIG. 20.

FIG. 24 is a front view of the torch handle 350 along the lines 24—24 of FIG. 20. At the top right portion of the drawing is the oxygen valve assembly 358 which is mounted on the housing 355, not seen in this view. The neck 362 of the housing 355 threadably engages the body 354. In the lower right portion of the drawing, the fuel valve assembly 366 threadably engages the housing 367, not seen in this view. The neck 370 threadably engages the body 354. A barrel 500 extends from the body 354 to the outlet end 352. In the center of FIG. 24 is the oxygen outlet port 456. Immediately adjacent the oxygen tube is the seat 457. Adjacent the circular seat 457 is a fuel gas outlet port 480, for the fuel gas. A seat 502 surrounds the opening for the fuel gas. On the exterior of the outlet end 352 is a plurality of threads 504.

Figure 25:
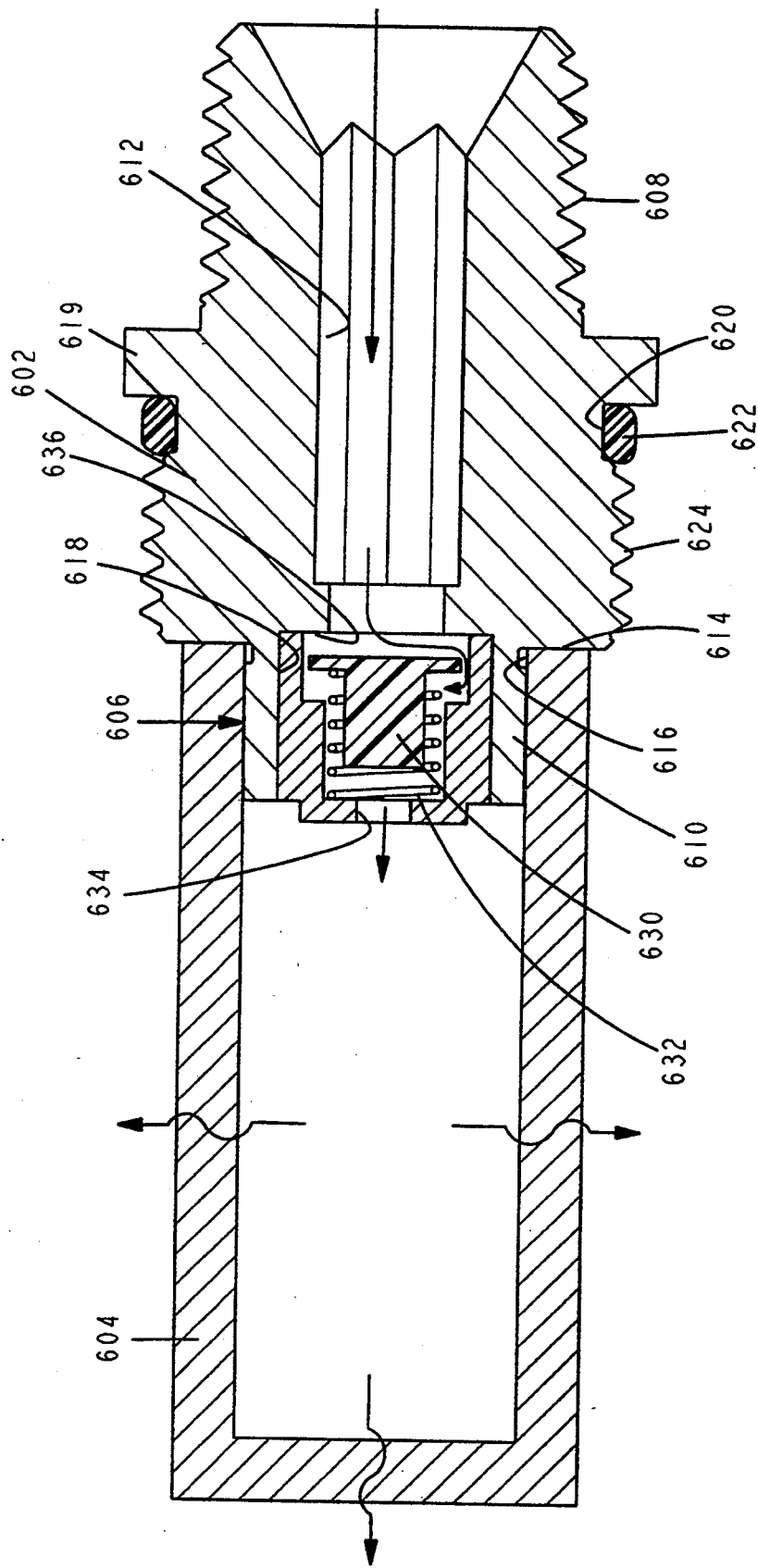
FIG. 25 is an alternative embodiment of the flashback assembly.

FIG. 25 is an alternative embodiment which can be used as either an oxygen flashback assembly or a fuel flashback assembly in either the cutting torch shown in FIG. 1 or the multi-purpose torch handle shown in FIG. 20.

The flashback assembly 600 includes three primary components as follows: a retainer 602, a flashback arrestor 604 and a check valve subassembly 606. A hose connector 608 is formed on [one end] and a neck 610 is formed on the other end of the retainer.

The porous metal flashback arrestor 604 is manufactured from powdered metal and is sintered to form an elongated cup-like structure. The flashback arrestor 604 is permeable to gas and forms tortuous pathways therethrough as indicated by the curved flow arrows in the drawing. The purpose of this flashback arrestor 604 is the same as those discussed herein, namely to reduce the possibility that a flamefront will pass through the arrestor 42 and migrate upstream of the torch into other components in the system the flashback arrestor can be manufactured in a number of different shapes as discussed herein which are within the scope of this invention.

The retainer includes a hexagonal central bore 612 which allows gas to pass through the retainer 602 as shown by the flow arrows in the drawing. The hexagonal bore 612 facilitates easy installation and removal of the flashback assembly 600 with an allen wrench from the body of a cutting torch or multi-purpose handle. A shoulder 614 is formed adjacent the neck 610 of the retainer 602. The porous metal flashback arrestor 604 is sized and dimensioned to abut the shoulder 614 and is pressed to fit on the neck 610. This press fit forms a gas-tight seal between the retainer 602 and the open end 616 of the porous flashback arrestor 604.

The check valve subassembly 606 is pressed to fit or can be threaded in the bore 618 of the retainer 602. The check valve subassembly 606 forms a gas-tight seal with the bore 618.

A circumferential flange 619 is formed near the center of the retainer 602 adjacent an O-ring groove 620 which receives O-ring 622. A plurality of threads 624 encircles the outer diameter of the retainer 602 and threadably engages the body of the cutting torch or the housing of a multi-purpose handle holding the flashback assembly 600 in place. The purpose of the O-ring 622 and the circumferential flange 619 is to provide a gas-tight seal to prevent either the escape of oxygen or fuel gas from the body or housing.

The check valve subassembly 606 includes a resilient moveable valve element 630, a spring 632 and an outlet port 634. The valve element 630 engages a seat 634 formed in the bore 600. In this figure, the check valve subassembly is shown in the open position. Gas passes from a hose, not shown in this figure, through the hexagonal bore 612, past the seat 634 and the valve element 630, through the outlet port 634 and through the flashback arrestor 604. When there is no gas pressure in the hexagonal bore 612, the spring 632 causes the moveable valve element 630 to move into engagement with the seat 636 to reduce the possibility of reverse gas flow from the torch or multi-purpose handle into the hose.

While the foregoing is directed to the preferred embodiment of the present invention, other and further embodiments of the invention may be devised without departing from the basic scope thereof, and the scope thereof is determined by the claims which follow.

We claim:

1. A cutting torch using fuel gas supplied by a fuel gas hose and oxygen supplied by an oxygen hose, said cutting torch comprising:
    (a) a torch handle having an oxygen passageway with a oxygen valve to control the flow of oxygen and a cutting oxygen valve to control the flow of cutting oxygen;
    (b) said handle also having a fuel passageway with a fuel valve to control the flow of fuel;
    (c) a first tube and a second tube extending from said handle to a head to convey gas from said handle to said head;
    (d) a cutting tip removably mounted in said head;
    (e) two removable flashback assemblies, each including:
        i. a check valve subassembly to reduce the possibility of reverse flow of gas from said cutting torch into the hose;
        ii. a retainer having a bore therethrough, said retainer defining a shoulder at a first end and a hose connector at a second end, and said bore sized and dimensioned to receive said check valve subassembly;
        iii. a flashback arrestor mounted on said shoulder to reduce the possibility of migration of a flashback from said torch handle into the hose;
    (f) a first chamber formed in said oxygen passageway; said chamber sized and dimensioned to removably receive a portion of said first flashback assembly; and
    (g) a second chamber formed in said fuel passageway, said second chamber sized and dimensioned to removably receive a portion of said second flashback assembly.

2. The apparatus of claim 1 wherein each of said flashback arrestors is formed from a porous, powdered stainless steel sintered cup which is permeable to gas.

3. The apparatus of claim 1 wherein each of said check valve subassemblies further includes:
    (a) a valve body having a bore therethrough, said bore in fluid communication with the gas hose;
    (b) a seat engaging said valve body;
    (c) a moveable valve element positioned adjacent to said seat;
    (d) a guide engaging said valve body, said guide having a plurality of fingers to correctly direct movement of said movable valve element; and
    (e) a spring positioned between said guide and said moveable valve element to urge said valve element into sealing engagement with said seat to reduce the possibility of reverse flow of gas from said cutting torch into the hose.

4. A multi-purpose torch handle using fuel gas supplied by a fuel gas hose and oxygen supplied by an oxygen hose, said torch handle comprising:
    (a) a body including fuel and oxygen gas passageways;
    (b) a removable first elongate cartridge, including:
        i. a first housing defining an oxygen passageway with a valve to control the volume of oxygen flowing through said passageway;
        ii. a first removable flashback assembly;
        iii. a chamber formed in said housing, said chamber sized and dimensioned to removably receive a portion of said first flashback assembly;
    (c) a removable second elongate cartridge, including:

i. a second housing defining a fuel gas passageway with a valve to control the volume of fuel gas flowing through said passageway;
ii. a second removable flashback assembly; and
iii. a chamber formed in said second housing, said chamber sized and dimensioned to removably receive a portion of said second flashback assembly.

5. The apparatus of claim 4 wherein each of said flashback assemblies includes:
   (a) a check valve subassembly to reduce the possibility of reverse flow of gas from said multi-purpose torch handle into the hose;
   (b) a retainer having a bore therethrough, said retainer defining a shoulder at a first end and a hose connector at a second end, and said bore sized and dimensioned to receive said check valve subassembly; and
   (c) a flashback arrestor mounted on said shoulder to reduce the possibility of migration of a flashback from said torch handle into the hose.

6. The apparatus of claim 5 wherein each of said flashback arrestors is formed from a porous, powdered stainless steel sintered cap which is permeable to gas.

7. The apparatus of claim 6 wherein each of said check valve subassemblies further include:
   (a) a valve body having a bore therethrough, said bore in fluid communication with the gas hose;
   (b) a seat engaging said valve body;
   (c) a moveable valve element positioned adjacent to said seat;
   (d) a guide engaging said valve body, said guide having a plurality of fingers to correctly direct movement of said movable valve element; and
   (e) a spring positioned between said guide and said moveable valve element to urge said valve element into sealing engagement with said seat to reduce the possibility of reverse flow of gas from said torch handle into the hose.

8. A multi-purpose torch handle using fuel gas supplied by a fuel gas hose and oxygen supplied by an oxygen hose, said torch handle comprising:
   (a) a body including fuel and oxygen gas passageways;
   (b) a removable first elongate cartridge, including;
      i. a first housing defining an oxygen passageway with a valve to control the volume of oxygen flowing through said passageway;
      ii. a first removable flashback assembly; and
      iii. a chamber formed in said housing, said chamber sized and dimensioned to removably receive a portion of said first flashback assembly; and
   (c) a removable second elongate cartridge, including;
      i. a second housing defining a fuel gas passageway with a valve to control the volume of fuel gas flowing through said passageway;
      ii. a second removable flashback assembly; and
      iii. a chamber formed in said second housing, said chamber sized and dimensioned to removably receive a portion of said second flashback assembly;
   each of said removable flashback assemblies being formed from a porous, powdered stainless steel sintered cap which is permeable to gas and including:
      i. a check valve subassembly to reduce the possibility of reverse flow of gas from said multi-purpose torch handle into the hose;
      ii. a retainer having a bore therethrough said retainer defining a shoulder at a first end and a hose connector at a second end, and said bore sized and dimensioned to receive said check valve subassembly; and
      iii. a flashback arrestor mounted on said shoulder to reduce the possibility of migration of a flashback from said torch handle into the hose;
   each of said check valve subassemblies including;
      i. a valve body having a bore therethrough, said bore in fluid communication with the gas hose, said valve body having a recessed channel formed on a first end and a flange formed on a second end, with one or more barbs disposed about the exterior of said body between said first end and said second end, said flange sized and dimensioned to seal against said receptacle in said retainer;
      ii. a seat engaging said recessed channel formed on said first end of said valve body;
      iii. a guide having a bore therethrough with peripheral vents in fluid communication with said bore, said guide engaging said barbs on said valve body;
      iv. a moveable valve element disposed in said bore of said guide adjacent to said seat; and
      v. a spring disposed between said moveable valve element and said guide to urge said valve element into sealing engagement with said seat to reduce the possibility of reverse flow of gas from said multi-purpose torch handle into the hose.

9. An after-market kit for adding flashback arrestors and check valves to a multi-purpose torch handle, using fuel gas supplied by a fuel hose, and oxygen supplied by an oxygen hose, said kit comprising:
   (a) a removable first elongate cartridge, including:
      i. a first housing defining an oxygen passageway with a valve to control the volume of oxygen flowing through said passageway;
      ii. a first removable flashback assembly;
      iii. a chamber formed in said housing, said chamber sized and dimensioned to removably receive a portion of said first flashback assembly;
   (b) a removable second elongate cartridge, including:
      i. a second housing defining a fuel gas passageway with a valve to control the volume of fuel gas flowing through said passageway;
      ii. a second removable flashback subassembly; and
      iii. a chamber formed in said second housing, said chamber sized and dimensioned to removably receive a portion of said second flashback assembly.

10. The apparatus of claim 9 wherein said first removable flashback assembly further includes:
    (a) a check valve subassembly to reduce the possibility of reverse flow of oxygen from said multi-purpose torch handle into the hose;
    (b) a retainer having a bore therethrough, said retainer defining a shoulder at a first end and a hose connector at a second end, and said bore sized and dimensioned to receive said check valve subassembly; and
    (c) a flashback arrestor mounted on said shoulder to reduce the possibility of migration of a flashback from said torch handle into the hose.

11. The apparatus of claim 10 wherein said first check valve subassembly further includes:

(a) a valve body having a bore therethrough, said bore in fluid communication with the oxygen hose;
(b) a seat engaging said valve body;
(c) a moveable valve element positioned adjacent to said seat;
(d) a guide engaging said valve body, said guide having a plurality of fingers to correctly direct movement of said movable valve element; and
(e) a spring positioned between said guide and said moveable valve element to urge said valve element into sealing engagement with said seat to reduce the possibility of reverse flow of gas from said torch handle into the hose.

12. A replaceable flashback assembly for use in a torch handle using fuel gas supplied by a fuel gas hose and oxygen supplied by an oxygen hose, said replaceable flashback assembly comprising:
(a) a check valve subassembly to reduce the possibility of reverse flow of gas from said torch handle into the hose;
(b) a retainer having a bore therethrough, said retainer defining a shoulder at a first end and a hose connector at a second end, and said bore sized and dimensioned to receive said check valve subassembly; and
(c) a flashback arrestor mounted on said shoulder to reduce the possibility of flashback from said torch handle into the hose.

13. The apparatus of claim 12 wherein said check valve subassembly further includes:
(a) a valve body having a bore therethrough, said bore in fluid communication with the gas hose;
(b) a seat engaging said valve body;
(c) a moveable valve element positioned adjacent to said seat;
(d) a guide engaging said valve body, said guide having a plurality of fingers to correctly direct movement of said movable valve element; and
(e) a spring positioned between said guide and said moveable valve element to urge said valve element into sealing engagement with said seat to reduce the possibility of reverse flow of gas from said multi-purpose torch handle into the hose.

14. The apparatus of claim 13 wherein said seat is annularly disposed about said bore and said movable valve element is movable against said seat to block gas flow in one direction and is movable away from said seat to allow flow in normal operation of said torch.

15. The apparatus of claim 14 wherein said flashback arrestor is formed from a porous, powdered metal sintered cap which is permeable to gas.

16. A replaceable flashback assembly for use in a torch handle using fuel gas supplied by a fuel gas hose and oxygen supplied by an oxygen gas hose, said replaceable flashback assembly comprising:
(a) a retainer having a bore therethrough, said bore in fluid communication with a gas hose, said retainer defining a hose connector at a first end and a holder at a second end;
(b) a check valve subassembly to reduce the possibility of reverse flow of gas from said torch handle into the hose, said check valve subassembly mounted in said holder of said retainer; and
(c) a flashback arrestor mounted on said retainer and enclosing said check valve subassembly, said flashback arrestor reducing the possibility of migration of a flashback from said torch handle into the hose.

17. The apparatus of claim 16 wherein said check valve subassembly further includes:
(a) a valve body having a bore therethrough, said bore in fluid communication with the gas hose;
(b) a seat engaging said valve body;
(c) a moveable valve element positioned adjacent to said seat;
(d) a guide engaging said valve body, said guide having a plurality of fingers to correctly direct movement of said movable valve element; and
(e) a spring positioned between said guide and said moveable valve element to urge said valve element into sealing engagement with said seat to reduce the possibility of reverse flow of gas from said torch handle into the hose.

18. The apparatus of claim 17 wherein said seat is annularly disposed about said bore and said movable valve element is movable against said seat to block gas flow in one direction and is movable away from said seat to allow flow in normal operation of said torch.

19. The apparatus of claim 18 wherein said flashback arrestor element is formed from a porous, powdered metal sintered cap which is permeable to gas.

* * * * *